(12) United States Patent
Yamashita et al.

(10) Patent No.: US 9,337,764 B2
(45) Date of Patent: May 10, 2016

(54) DRIVE CONTROL DEVICE, ELECTRICAL APPARATUS AND DRIVE CONTROL METHOD

(75) Inventors: Saiji Yamashita, Osaka (JP); Minoru Haru, Osaka (JP)

(73) Assignee: Matsui Mfg. Co., Ltd., Osaka (JP)

( * ) Notice: Subject to any disclaimer, the term of this patent is extended or adjusted under 35 U.S.C. 154(b) by 179 days.

(21) Appl. No.: 14/237,347

(22) PCT Filed: Aug. 20, 2012

(86) PCT No.: PCT/JP2012/070953
§ 371 (c)(1),
(2), (4) Date: Feb. 5, 2014

(87) PCT Pub. No.: WO2013/031560
PCT Pub. Date: Mar. 7, 2013

(65) Prior Publication Data
US 2014/0191703 A1    Jul. 10, 2014

(30) Foreign Application Priority Data
Sep. 1, 2011   (JP) .................................. 2011-191038

(51) Int. Cl.
| H02P 23/00 | (2006.01) |
| H02P 25/00 | (2006.01) |
| H02P 27/00 | (2006.01) |
| B02C 18/24 | (2006.01) |
| B02C 18/14 | (2006.01) |
| H02P 27/04 | (2016.01) |
| B02C 4/08 | (2006.01) |
| B02C 4/10 | (2006.01) |
| B02C 4/42 | (2006.01) |

(52) U.S. Cl.
CPC .............. *H02P 23/0077* (2013.01); *B02C 4/08* (2013.01); *B02C 4/10* (2013.01); *B02C 4/42* (2013.01); *B02C 18/142* (2013.01); *B02C 18/24* (2013.01); *H02P 23/009* (2013.01); *H02P 27/047* (2013.01)

(58) Field of Classification Search
CPC .................................................. H02P 23/0077
USPC ........................................................... 318/807
See application file for complete search history.

(56) References Cited

U.S. PATENT DOCUMENTS

| 2008/0129237 A1* | 6/2008 | Atarashi et al. ............... 318/492 |
| 2011/0256005 A1* | 10/2011 | Takeoka et al. ............... 417/415 |
| 2013/0134910 A1* | 5/2013 | Iwashita et al. ............... 318/376 |

FOREIGN PATENT DOCUMENTS

| JP | 62-272890 A | 11/1987 |
| JP | 06-233590 A | 8/1994 |
| JP | 2000-70749 A | 3/2000 |
| JP | 2001-073988 A | 3/2001 |
| JP | 2009-225596 A | 10/2009 |
| JP | 2011-036852 A | 2/2011 |

* cited by examiner

*Primary Examiner* — Erick Glass
(74) *Attorney, Agent, or Firm* — Bret E. Field; Bozicevic, Field & Francis LLP

(57) ABSTRACT

A drive control device is provided with a physical amount detection unit which detects the physical amount pertaining to the output of a motor, a rotational frequency determination unit for determining whether the rotational frequency of the motor is equal to or greater than a base rotational frequency, a threshold value selection unit for selecting a threshold value for the physical amount in accordance with the determination result of the rotational frequency determination unit, and a rotational frequency control unit for controlling the rotational frequency of a rotating shaft in accordance with the magnitude relationship between the detected physical amount and the selected threshold value.

19 Claims, 23 Drawing Sheets

FIG. 5

RELATED ART

| INVERTER FREQUENCY (Hz) | ROTATIONAL FREQUENCY OF MOTOR SHAFT (rpm) | REDUCTION GEAR RATIO | ROTATIONAL FREQUENCY OF ROTATING SHAFT (rpm) |
|---|---|---|---|
| 50 | 1500 | $\frac{1}{80}$ | 18.75 |
| 60 | 1800 | $\frac{1}{80}$ | 22.5 |

FIG. 13

| | INVERTER FREQUENCY (Hz) | MOTOR RATING (kw) | REDUCTION GEAR RATIO | POWER FACTOR | AVERAGE POWER CONSUMPTION (w) | |
|---|---|---|---|---|---|---|
| PRESENT EMBODIMENT | 120 | 0.4 | $\frac{1}{160}$ | 0.43 | 98.3 | ENERGY SAVING 36.7% |
| COMPARATIVE EXAMPLE | 60 | 0.75 | $\frac{1}{80}$ | 0.23 | 155.2 | |

DRIVE CONTROL DEVICE, ELECTRICAL APPARATUS AND DRIVE CONTROL METHOD

CROSS-REFERENCE TO RELATED APPLICATIONS

This application is the national phase under 35 U.S.C. §371 of PCT International Application No. PCT/JP2012/070953 which has an International filing date of Aug. 20, 2012 and designated the United States of America.

BACKGROUND

The present invention relates to a drive control device for controlling drive of an electrical apparatus including a rotor provided on a rotating shaft that is rotated by an electric motor driven by an inverter for converting a frequency of an AC power supply, an electrical apparatus including the drive control device, and a drive control method.

DESCRIPTION OF RELATED ART

In order to overcome problems of environmental pollution and increase of industrial wastes, it has been more and more significant to establish recycling-based society. For example, in a molding plant for manufacturing moldings or molded components by using synthetic resins represented by plastic, unwanted parts designated as sprue runners or defective moldings produced in a molding process are collected to improve a resource recycling rate of a resin material.

For recycling a resin material, the collected sprue runners are crushed by a crusher into a crushed material in a prescribed size to be used as a recycle source. In such a crusher, in order that a sprue runner (a processing object) introduced through an inlet hopper can be easily bit by a grinding blade, for example, the sprue runner is first primarily crushed by a cracking blade, and then, the primarily crushed material is crushed by the grinding blade into a crushed material in a desired grain shape. A uniaxial type crusher including a rotary blade such as a cracking blade or a grinding blade fixed on one rotating shaft is utilized in a large number of facilities aiming at in-house recycling because such a crusher includes a small number of drive components for driving the rotating shaft and has a simple structure.

A variety of processing objects are introduced into such a crusher, and it is sometimes desired to crush some processing object into crushed pieces of a different size. For this purpose, a crusher in which a current of a drive motor of the crusher is detected, the frequency of an inverter is changed in accordance with the magnitude of the detected current and the rotational frequency of the drive motor is changed so as to crush a material into crushed pieces of a desired size has been disclosed (see Japanese Patent Application Laid-Open No. 2000-70749).

SUMMARY

In a conventional crusher, the amount of a processing object to be introduced is not always constant, and hence, the load state is largely varied in some cases. Therefore, a drive system of the crusher including the drive motor, the rotary blade and the rotating shaft is designed to have a maximum torque with a considerable margin. Besides, a crusher is operated with a constant torque characteristic so as to always attain the maximum torque in anticipation of load variation, but the crusher is very rarely operated in the vicinity of the maximum torque in a usual operation, and is designed to be always operated with a margin. Therefore, a drive motor with a large capacity (a large rated value) is driven at a low load ratio, and this leads to a problem in which a sufficient energy-saving operation cannot be performed. In addition, such a device dealing with a variety of loads is not limited to the crusher but applies to other electrical apparatuses used in industrial machinery, and such electrical apparatuses also face this problem.

The present invention was devised in consideration of the aforementioned circumstances, and an object of the present invention is to provide a drive control device capable of controlling the rotational frequency of an electrical apparatus in accordance with a load characteristic, an electrical apparatus including the drive control device, and a drive control method.

A drive control device according to a first aspect is a drive control device for controlling drive of an electrical apparatus, which includes a rotor provided on a rotating shaft rotated by an electric motor driven by an inverter for converting a frequency of an AC power supply, including: a physical amount detection unit for detecting a plurality of physical amounts pertaining to an output of the electric motor; a storage unit for storing threshold values for the physical amounts; a rotational frequency determination unit for determining whether or not a rotational frequency of the electric motor is equal to or greater than a base rotational frequency; a selection unit for selecting a threshold value for each of the physical amounts in accordance with a determination result obtained by the rotational frequency determination unit; and a control unit for controlling a rotational frequency of the rotating shaft in accordance with a magnitude relationship between a physical amount detected by the physical amount detection unit and a threshold value selected by the selection unit.

According to a second aspect, in the drive control device according to the first aspect, the physical amount detection unit detects the output of the electric motor, the selection unit selects a specific power threshold value if the rotational frequency of the electric motor is equal to or greater than the base rotational frequency, and the control unit controls the rotational frequency of the rotating shaft in accordance with a magnitude relationship between the output detected by the physical amount detection unit and the specific power threshold value.

According to a third aspect, in the drive control device according to the first aspect, the physical amount detection unit detects a feature amount pertaining to a torque of the electric motor, the selection unit selects a specific torque amount threshold value if the rotational frequency of the electric motor is not equal to or greater than the base rotational frequency, and the control unit controls the rotational frequency of the rotating shaft in accordance with a magnitude relationship between the feature amount detected by the physical amount detection unit and the specific torque amount threshold value.

A drive control device according to a fourth aspect is a drive control device for controlling drive of an electrical apparatus, which includes a rotor provided on a rotating shaft rotated by an electric motor driven by an inverter for converting a frequency of an AC power supply, including: a physical amount detection unit for detecting a feature amount pertaining to a torque of the electric motor; a threshold value calculation unit for calculating a feature amount threshold value for the feature amount; and a control unit for controlling, in operating the electric motor at a rotational frequency equal to or greater than a base rotational frequency, a rotational frequency of the rotating shaft in accordance with a magnitude relationship between the feature amount detected by the physical amount detection unit and the feature amount threshold value calculated by the threshold value calculation unit.

According to a fifth aspect, the drive control device according to the fourth aspect, further includes a frequency detection unit for detecting a frequency converted by the inverter, and the threshold value calculation unit calculates the feature amount threshold value on the basis of the frequency detected by the frequency detection unit and a reference threshold value corresponding to the base rotational frequency, and the control unit controls the rotational frequency of the rotating shaft in accordance with the magnitude relationship between the feature amount detected by the physical amount detection unit and the feature amount threshold value calculated by the threshold value calculation unit.

According to a sixth aspect, in the drive control device according to the fourth aspect, in operating the electric motor at a rotational frequency equal to or greater than the base rotational frequency, the control unit lowers the rotational frequency of the rotating shaft if the feature amount detected by the physical amount detection unit is larger than the feature amount threshold value.

According to a seventh aspect, in the drive control device according to the fourth aspect, in operating the electric motor at a rotational frequency equal to or greater than the base rotational frequency, the control unit increases the rotational frequency of the rotating shaft if the feature amount detected by the physical amount detection unit is smaller than the feature amount threshold value.

A drive control device according to an eighth aspect is a drive control device for controlling drive of an electrical apparatus, which includes a rotor provided on a rotating shaft rotated by an electric motor driven by an inverter for converting a frequency of an AC power supply, including: a physical amount detection unit for detecting an output of the electric motor; a threshold value calculation unit for calculating a power threshold value for the output of the electric motor; and a control unit for controlling, in operating the electric motor at a rotational frequency equal to or lower than a base rotational frequency, a rotational frequency of the rotating shaft in accordance with a magnitude relationship between the output detected by the physical amount detection unit and the power threshold value calculated by the threshold value calculation unit.

According to a ninth aspect, the drive control device according to the eighth aspect, further includes a frequency detection unit for detecting a frequency converted by the inverter, and the threshold value calculation unit calculates the power threshold value on the basis of the frequency detected by the frequency detection unit and a reference threshold value corresponding to the base rotational frequency, and the control unit controls the rotational frequency of the rotating shaft in accordance with the magnitude relationship between the output detected by the physical amount detection unit and the power threshold value calculated by the threshold value calculation unit.

According to a tenth aspect, in the drive control device according to the eighth aspect, in operating the electric motor at a rotational frequency equal to or lower than the base rotational frequency, the control unit lowers the rotational frequency of the rotating shaft if the output detected by the physical amount detection unit is larger than the power threshold value.

According to an eleventh aspect, in the drive control device according to the eighth aspect, in operating the electric motor at a rotational frequency equal to or lower than the base rotational frequency, the control unit increases the rotational frequency of the rotating shaft if the output detected by the physical amount detection unit is smaller than the power threshold value.

According to a twelfth aspect, the drive control device according to any one of the first to eleventh aspects, further includes a determination unit that causes the inverter to convert the frequency of the AC power supply to a low frequency lower than the frequency and causes the rotor to perform a prescribed process to determine whether or not the process by the rotor can be performed.

According to a thirteenth aspect, the drive control device according to the twelfth aspect, further includes a statistic calculation unit for calculating a statistic by collecting feature amounts pertaining to a torque detected by the physical amount detection unit, and the determination unit determines whether or not the process can be performed on the basis of the statistic calculated by the statistic calculation unit.

An electrical apparatus according to a fourteenth aspect includes an inverter for converting a frequency of an AC power supply, an electric motor driven by the inverter, a rotor provided on a rotating shaft rotated by the electric motor, and the drive control device according to any one of the aforementioned aspects, and the drive control device controls a rotational frequency of the rotating shaft.

A drive control method according to a fifteenth aspect is a drive control method for an electrical apparatus, which includes a rotor provided on a rotating shaft rotated by an electric motor driven by an inverter for converting a frequency of an AC power supply, including the steps of: detecting a plurality of physical amounts pertaining to an output of the electric motor; determining, with threshold values for the physical amounts stored, whether or not a rotational frequency of the electric motor is equal to or greater than a base rotational frequency; selecting a threshold value for each of the physical amounts in accordance with a determination result obtained in the determining step; and controlling a rotational frequency of the rotating shaft in accordance with a magnitude relationship between a detected physical amount and a selected threshold value.

A drive control method according to a sixteenth aspect is a drive control method for an electrical apparatus, which includes a rotor provided on a rotating shaft rotated by an electric motor driven by an inverter for converting a frequency of an AC power supply, including the steps of: detecting a feature amount pertaining to a torque of the electric motor; calculating a feature amount threshold value for the feature amount; and controlling, in operating the electric motor at a frequency equal to or greater than a base rotational frequency, a rotational frequency of the rotating shaft in accordance with a magnitude relationship between the detected feature amount and the calculated feature amount threshold value.

A drive control method according to a seventeenth aspect is a drive control method for an electrical apparatus, which includes a rotor provided on a rotating shaft rotated by an electric motor driven by an inverter for converting a frequency of an AC power supply, including the steps of: detecting an output of the electric motor; calculating a power threshold value for the output of the electric motor; and controlling, in operating the electric motor at a rotational frequency equal to or lower than a base rotational frequency, a rotational frequency of the rotating shaft in accordance with a magnitude relationship between the detected output and the calculated power threshold value.

In the first and the fifteenth aspects, a physical amount detection unit for detecting a plurality of physical amounts pertaining to an output of the electric motor; a storage unit for storing threshold values for the physical amounts; a rotational frequency determination unit for determining whether or not a rotational frequency of the electric motor is equal to or greater than a base rotational frequency; a selection unit for selecting a threshold value for each of the physical amounts in accordance with a determination result obtained by the rotational frequency determination unit; and a control unit for controlling a rotational frequency of the rotating shaft in accordance with a magnitude relationship between the detected physical amount and the selected threshold value are provided. The physical amount pertaining to the output of the electric motor is, for example, a torque, a torque current, a load current, an output power (output of a motor) or the like of an electric motor (motor). If the torque current of the electric motor or the load current of the electric motor is detected as the physical amount, the detected torque current or load current may be converted into a torque. The base rotational frequency is a synchronous rotational frequency determined depending upon the base frequency (of, for example, 50 Hz or 60 Hz) output from the inverter to the electric motor and the number of poles of the electric motor. Since the base rotational frequency of the electric motor and the base frequency of the inverter are uniquely determined, the determination made by the rotational frequency determination unit whether or not the rotational frequency of the electric motor is equal to or greater than the base rotational frequency has the same meaning as determination whether or not the frequency of the inverter is equal to or greater than the base frequency.

The output characteristic of the electric motor controlled by the inverter shows the constant torque characteristic at a rotational frequency equal to or lower than the base rotational frequency (namely, at a frequency equal to or lower than the base frequency), and shows the constant output characteristic (constant output power characteristic) at a rotational frequency equal to or greater than the base rotational frequency (at a frequency equal to or greater than the base frequency). In other words, the rotational frequency determination unit determines whether the electric motor is operated in a constant torque region or in a constant output region. The selection unit selects a threshold value for a physical amount in accordance with the determination result obtained by the rotational frequency determination unit. If it is determined, for example, that the rotational frequency of the electric motor is equal to or greater than the base rotational frequency (namely, it is determined that the electric motor is operated in the constant output region), a power threshold value for the output power (physical amount) of the electric motor is selected. When the electric motor is operated in the constant output region, the output power of the electric motor is constant, and hence, a specific (fixed) power threshold value can be used. Alternatively, if it is determined that the rotational frequency of the electric motor is not equal to or greater than the base rotational frequency (namely, if it is determined that the electric motor is operated in the constant torque region), a torque threshold value for a torque (physical amount) of the electric motor is selected. When the electric motor is operated in the constant torque region, the torque of the electric motor is constant, and hence, a specific (fixed) torque threshold value can be used.

The control section controls the rotational frequency of the rotating shaft of the electrical apparatus in accordance with a magnitude relationship between the detected physical amount and the selected threshold value. Specifically, if the electric motor is operated in the constant output region, the output power (output) of the electric motor is detected as the physical amount, and the rotational frequency of the electric motor is controlled in accordance with the magnitude relationship between the detected output power and the power threshold value. The torque Tm of the electric motor can be expressed as Tm=a×Pw/Vf. Here, a is a coefficient determined by the structure of the electric motor, Pw is the output power of the electric motor, and Vf is a rotational frequency of the motor shaft of the electric motor. If the torque of the electric motor operated in the constant output region is varied in accordance with a load state, the output power of the electric motor is varied assuming that the rotational frequency of the electric motor is not changed. Therefore, if the detected output power (output) is smaller than the power threshold value, the load is low, and hence, the rotational frequency of the rotating shaft of the electrical apparatus is increased for increasing grinding capacity. Alternatively, if the detected output power is larger than the power threshold value, the load is high, and hence, the torque is increased by lowering the rotational frequency for preventing overload stop.

On the other hand, if the electric motor is operated in the constant torque region, the torque (or a torque current, a load current or the like related to the torque) of the electric motor is detected as the physical amount, and the rotational frequency of the rotating shaft of the electrical apparatus is controlled in accordance with a magnitude relationship between the detected torque and the torque threshold value. Incidentally, the control of the rotational frequency of the rotating shaft of the electrical apparatus has the same meaning as control of the frequency of the output voltage of the inverter or control of the rotational frequency of the motor shaft of the electric motor.

As described above, if the electric motor is operated at a rotational frequency equal to or greater than the base rotational frequency, for controlling the rotational frequency of the rotating shaft of the electrical apparatus in accordance with the load state, the rotational frequency of the electric motor can be controlled in accordance with the load merely by comparing the magnitudes of the detected output power (physical amount) and the power threshold value. Therefore, for example, an inverter of a relatively low cost that outputs merely the output power of the electric motor can be used for controlling the rotational frequency of the electrical apparatus. Furthermore, since the value of a torque is changed in accordance with the rotational frequency in the constant output region of the electric motor, it is necessary to use different threshold values in accordance with the rotational frequency of the electric motor for the comparison of a detected torque value and a threshold value. Accordingly, for controlling the rotational frequency of the electric motor, it is necessary to calculate a threshold value in accordance with the rotational frequency, which increases the cost due to addition of a configuration for the calculation. Since the magnitudes of the detected output power (physical amount) and the power threshold value are compared, there is no need to calculate a threshold value for the torque, which reduces the cost, and thus, a simple configuration can be employed for controlling the rotational frequency of the electrical apparatus in accordance with the load characteristic.

In the second aspect, the physical amount detection unit detects the output (output power) of the electric motor, and if the rotational frequency of the electric motor is equal to or greater than the base rotational frequency (namely, if the electric motor is operated in the constant output region), the selection unit selects a specific (fixed) power threshold value. The control section controls the rotational frequency of the rotating shaft in accordance with a magnitude relationship between the detected output power and the specific power threshold value. If the electric motor is operated at a rotational frequency equal to or greater than the base rotational frequency, for controlling the rotational frequency in accordance with the load state, the rotational frequency of the electric motor can be controlled in accordance with the load merely by comparing the magnitudes of the detected output power (physical amount) and the specific power threshold value. Therefore, there is no need to calculate a threshold value, and thus, a simple configuration can be employed for controlling the rotational frequency of the electrical apparatus in accordance with the load characteristic.

In the third aspect, the feature amount pertaining to the torque of the electric motor is detected. The feature amount pertaining to the torque is a torque, a torque current, a load current or the like. If the rotational frequency of the electric motor is not equal to or greater than the base rotational frequency (namely, if the electric motor is operated in the constant torque region), a specific (fixed) torque amount threshold value is selected. The control section controls the rotational frequency of the rotating shaft in accordance with a magnitude relationship between the detected feature amount and the specific torque amount threshold value. If the electric motor is operated at a rotational frequency equal to or lower than the base rotational frequency, for controlling the rotational frequency in accordance with the load state, the rotational frequency of the electric motor can be controlled in accordance with the load merely by comparing the magnitudes of the detected feature amount pertaining to the torque (physical amount) and the specific torque threshold value. Therefore, there is no need to calculate a threshold value, and thus, a simple configuration can be employed for controlling the rotational frequency of the electrical apparatus in accordance with the load characteristic.

In the fourth and sixteenth aspects, a physical amount detection unit for detecting a feature amount pertaining to a torque of the electric motor; a threshold value calculation unit for calculating a feature amount threshold value for the feature amount; and a control unit for controlling, in operating the electric motor at a rotational frequency equal to or greater than a base rotational frequency, a rotational frequency of the rotating shaft in accordance with a magnitude relationship between the detected feature amount and the feature amount threshold value are provided. The feature amount pertaining to the torque is, for example, a torque itself, a torque current, a load current or the like of the electric motor (motor). If the torque current of the electric motor or the load current of the electric motor is detected as the feature amount, the detected torque current or load current may be converted into a torque. The base rotational frequency is a synchronous rotational frequency determined depending upon the base frequency (of, for example, 50 Hz or 60 Hz) output from the inverter to the electric motor and the number of poles of the electric motor. In other words, the base rotational frequency of the motor shaft of the electric motor and the frequency of the inverter are uniquely determined.

The output characteristic of the electric motor controlled by the inverter shows the constant torque characteristic at a rotational frequency equal to or lower than the base rotational frequency, and shows the constant output characteristic (constant output power characteristic) at a rotational frequency equal to or greater than the base rotational frequency. If the electric motor is operated at a rotational frequency equal to or greater than the base rotational frequency, namely, operated in the constant output region, the control unit controls the rotational frequency of the rotating shaft in accordance with a magnitude relationship between the detected feature amount pertaining to the torque and a feature amount threshold value (such as a torque threshold value, a torque current threshold value or a load current threshold value). For example, if the detected feature amount pertaining to the torque is smaller than the feature amount threshold value, the load is low, and hence, the rotational frequency is increased for increasing the grinding capacity. Alternatively, if the detected feature amount pertaining to the torque is larger than the feature amount threshold value, the load is high, and hence the torque is increased by lowering the rotational frequency for preventing the overload stop. In this manner, a torque characteristic in accordance with the load characteristic can be realized and the maximum processing capacity can be attained, and the torque can be changed in accordance with load variation. Therefore, there is no need to precedently provide an electric motor with a large capacity (a large rated value), and there is no need to operate an electric motor with a large capacity at a low load ratio, and hence, an inexpensive motor with a low capacity can be used and the energy can be saved. Besides, the rotational frequency of the electrical apparatus can be controlled in accordance with the load characteristic.

In the fifth aspect, the threshold value calculation unit calculates the feature amount threshold value on the basis of the frequency converted by the inverter and the reference threshold value corresponding to the base rotational frequency. The reference threshold value Tc corresponding to the base rotational frequency (base frequency) is a torque threshold value constant in the constant torque region. Assuming that the frequency converted by the inverter is F, a feature amount threshold value Tf at the frequency F can be calculated in accordance with an expression, Tf=Tc×base frequency/F. Specifically, the feature amount threshold value at a frequency equal to or greater than the base frequency (of, for example, 50 Hz or 60 Hz) is reduced as the frequency is increased, and a threshold value according to a torque curve of the electric motor in the constant output region can be obtained. The control section controls the rotational frequency of the rotating shaft in accordance with a magnitude relationship between the detected feature amount and the calculated feature amount threshold value. Since a threshold value according to the torque curve of the electric motor can be obtained, even if the rotational frequency of the rotating shaft of the electrical apparatus is changed in accordance with load variation, a threshold value according to the load variation can be used, and therefore, the electrical apparatus can be operated with an optimum torque output while optimizing the rotational frequency of the rotating shaft of the electrical apparatus.

In the sixth aspect, in operating the electric motor at a rotational frequency equal to or greater than the base rotational frequency, namely, in operating the electric motor in the constant output region, the control unit lowers the rotational frequency of the rotating shaft if the detected feature amount is larger than the feature amount threshold value. For example, if the detected torque (feature amount) exceeds the feature amount threshold value due to load variation, the torque is increased by lowering the rotational frequency of the rotating shaft. Thus, even if the load becomes high, a necessary torque can be obtained, so as to prevent the overload stop in accordance with the load variation.

In the seventh aspect, in operating the electric motor at a rotational frequency equal to or greater than the base rotational frequency, namely, in operating the electric motor in the constant output region, the control unit increases the rotational frequency of the rotating shaft if the detected feature amount is smaller than the feature amount threshold value. For example, if the detected torque (feature amount) is smaller than the feature amount threshold value due to load variation, the torque is reduced by increasing the rotational frequency of the rotating shaft. Thus, even if the load becomes low, the rotational frequency can be increased while retaining a necessary torque, and hence, the grinding capacity can be increased in accordance with the load variation.

In the eighth and seventeenth aspects, a physical amount detection unit for detecting an output (output power) of the electric motor; a threshold value calculation unit for calculating a power threshold value for the output of the electric motor; and a control unit for controlling, in operating the electric motor at a rotational frequency equal to or lower than a base rotational frequency, a rotational frequency of the rotating shaft in accordance with a magnitude relationship between the detected output and the power threshold value are provided. The base rotational frequency is a synchronous rotational frequency determined depending upon the base frequency (of, for example, 50 Hz or 60 Hz) output from the inverter to the electric motor and the number of poles of the electric motor. In other words, the base rotational frequency of the motor shaft of the electric motor and the frequency of the inverter are uniquely determined.

The output characteristic of the electric motor controlled by the inverter shows the constant torque characteristic at a rotational frequency equal to or lower than the base rotational frequency, and shows the constant output characteristic (constant output power characteristic) at a rotational frequency equal to or greater than the base rotational frequency. If the electric motor is operated at a rotational frequency equal to or lower than the base rotational frequency, namely, operated in the constant torque region, the control unit controls the rotational frequency of the rotating shaft in accordance with a magnitude relationship between the detected output power (output) and the power threshold value. A torque Tm of the electric motor can be expressed as $Tm=a \times Pw/Vf$. Here, a is a coefficient determined by the structure of the electric motor, Pw is the output power of the electric motor, and Vf is a rotational frequency of the motor shaft of the electric motor. If the torque of the electric motor operated in the constant torque region is varied in accordance with a load state, the output power of the electric motor is varied assuming that the rotational frequency of the electric motor is not changed.

Therefore, if the detected output power is smaller than the power threshold value, the load is low, and hence, the rotational frequency is increased for increasing the grinding capacity. Alternatively, if the detected output power is larger than the power threshold value, the load is high, and hence, the torque is increased by lowering the rotational frequency for preventing the overload stop. In this manner, a torque in accordance with the load characteristic can be obtained and the maximum processing capacity can be attained with the optimum rotational frequency. Therefore, there is no need to precedently provide an electric motor with a large capacity (a large rated value), and there is no need to operate an electric motor with a large capacity at a low load ratio, and hence, an inexpensive motor with a low capacity can be used and the energy can be saved. Besides, the rotational frequency of the electrical apparatus can be controlled in accordance with the load characteristic.

In the ninth aspect, the threshold calculation unit calculates the power threshold value on the basis of the frequency converted by the inverter and the reference threshold value corresponding to the base rotational frequency. The reference threshold value Pc corresponding to the base rotational frequency (base frequency) is a power threshold value constant in the constant output region. Assuming that the frequency converted by the inverter is F, a power threshold value Pf at the frequency F can be calculated in accordance with an expression, $Pf=Pc \times F/base\ frequency$. Specifically, the power threshold value at a frequency equal to or lower than the base frequency (of, for example, 50 Hz or 60 Hz) is increased as the frequency is increased, and a threshold value according to the output power curve of the electric motor in the constant torque region can be obtained. The control section controls the rotational frequency of the rotating shaft in accordance with a magnitude relationship between the detected output power and the calculated power threshold value. Since a threshold value according to the output power curve of the electric motor can be obtained, even if the rotational frequency of the rotating shaft of the electrical apparatus is changed in accordance with load variation, a threshold value according to the load variation can be used, and therefore, the electrical apparatus can be operated with an optimum torque output while optimizing the rotational frequency of the rotating shaft of the electrical apparatus.

In the tenth aspect, in operating the electric motor at a frequency equal to or lower than the base rotational frequency, namely, in operating the electric motor in the constant torque region, if the detected output power is larger than the power threshold value, the control unit lowers the rotational frequency of the rotating shaft. For example, if the detected output power exceeds the power threshold value due to load variation, the torque is increased by lowering the rotational frequency of the rotating shaft. Thus, even when the load becomes high, a necessary torque can be obtained, so as to prevent the overload stop in accordance with the load variation.

In the eleventh aspect, in operating the electric motor at a frequency equal to or lower than the base rotational frequency, namely, in operating the electric motor in the constant torque region, if the detected output power is smaller than the power threshold value, the control unit increases the rotational frequency of the rotating shaft. For example, if the detected output power is smaller than the power threshold value due to load variation, the torque is lowered by increasing the rotational frequency of the rotating shaft. Thus, even when the load becomes low, the rotational frequency can be increased while retaining a necessary torque, so as to increase the grinding capacity in accordance with the load variation.

In the twelfth aspect, a determination unit that causes the inverter to convert the frequency of the AC power supply to a low frequency lower than the frequency and causes the rotor to perform a prescribed process to determine whether or not the process by the rotor can be performed is provided. The low frequency region is, for example, a frequency ranging from several Hz to approximately 20 Hz. The low frequency region is preferably approximately 10% of the AC power supply (of a commercial frequency of 50 Hz or 60 Hz) and can be set to a range of 5 Hz or 6 Hz±several Hz. If the electrical apparatus is a crusher including one or a plurality of rotating shafts, the prescribed process is a process of crushing a grinding object with rotary blades. It is noted that the electrical apparatus is not limited to the crusher.

When the inverter is operated with its output frequency set to the commercial frequency (of 50 Hz or 60 Hz) and the prescribed process is performed, for example, by crushing a grinding object, transient overload is caused, and a large load is applied to the rotary blade (rotating shaft). Since the inertia of the motor shaft (electric motor shaft) rotating at a higher speed than the rotating shaft is large, if the overload is applied to the rotating shaft, an inertia-added torque (a multiplied value of a moment of inertia and an angular acceleration) much greater than the torque of the electric motor (torque caused by the drive current of the electric motor) is caused due to the large inertia of the motor shaft rotating at a high speed, and the actual torque (torque actually applied to the load) is a sum of the torque of the electric motor and the inertia-added torque. Specifically, if the inverter is operated at the commercial frequency, the actual torque is not the torque of the electric motor alone but a large torque corresponding to a sum of the torque of the electric motor and the inertia-added torque. Therefore, if it is determined, as in the conventional technique, whether or not a grinding object can be crushed depending upon whether or not the torque of the electric motor falls in an allowable range, since an unexpectedly large torque is actually applied to the load, it is apprehended that the actual torque may exceed the allowable range.

On the other hand, the torque (actual torque) applied to the load, namely, a force to cut a grinding object, is constant regardless of the magnitude of the rotational frequency of the rotating shaft (rotary blade) (the output frequency of the inverter). Therefore, the inverter is operated in a state where its output frequency falls in the low frequency region, so as to reduce (lower) the rotational frequency of the motor shaft, and thus, the influence of the inertia-added torque is minimized, so as to crush the grinding object in a state where the torque of the electric motor is close to the actual torque. By determining whether or not the torque of the electric motor falls in the allowable range in this case, it can be approximately determined whether or not the actual torque falls in the allowable range in crushing the grinding object. Thus, no matter whether the output frequency of the inverter is set to the commercial frequency, a frequency equal to or greater than the commercial frequency or a frequency equal to or lower than the commercial frequency, it is determined whether or not the actual torque falls in the allowable range. Therefore, even when transient overload is caused, the actual torque does not exceed the allowable range, and it can be definitely determined whether or not the grinding object can be crushed. Incidentally, the torque current or the load current of the electric motor can be used instead of the torque of the electric motor.

In the thirteenth aspect, a statistic calculation unit for calculating a statistic by collecting detected feature amounts pertaining to a torque is provided, and the determination unit determines whether or not the process can be performed on the basis of the calculated statistic. The feature amount pertaining to the torque is, for example, a torque of the electric motor, a torque current or a load current of the electric motor, or the like. The statistic is obtained by, for example, detecting a plurality of peak values of a feature amount (such as a torque) and calculating a mean or a maximum value of the detected peak values. The determination unit determines whether or not the prescribed process, such as the grinding process, can be performed depending upon whether or not the calculated statistic of the feature amount falls in an allowable range (such as an allowable torque range). If the torque current or the load current of the electric motor is detected as the feature amount, the detected torque current or load current may be converted into a torque. Since the statistic is used, it is determined, in consideration of variation of the feature amount (such as a torque) caused depending upon the grinding/crushing state of the grinding object, whether or not the feature amount falls in the allowable range, it can be definitely determined whether or not the grinding object can be crushed.

In the fourteenth aspect, an inverter for converting a frequency of an AC power supply, an electric motor driven by the inverter, a rotor provided on a rotating shaft rotated by the electric motor, and the above-described drive control device are provided. The drive control device controls a rotational frequency of the rotating shaft. In this manner, the rotational frequency of the rotating shaft can be controlled in accordance with the load characteristic. Besides, an inexpensive electric motor with a low capacity can be used, and the energy can be saved.

According to the present invention, the rotational frequency of an electrical apparatus can be controlled in accordance with a load characteristic. Furthermore, an inexpensive electric motor with a low capacity can be used and energy can be saved.

The above and further objects and features of the invention will more fully be apparent from the following detailed description with accompanying drawings.

BRIEF DESCRIPTION OF THE DRAWING

FIG. 5 is an explanatory diagram illustrating a relationship between the rotational frequency of a rotating shaft and the frequency of an inverter in a conventional crusher.

FIG. 13 is an explanatory diagram illustrating exemplified characteristics attained in an operation of the crusher of Embodiment 2.

DETAILED DESCRIPTION

Embodiment 1

Figure 1:
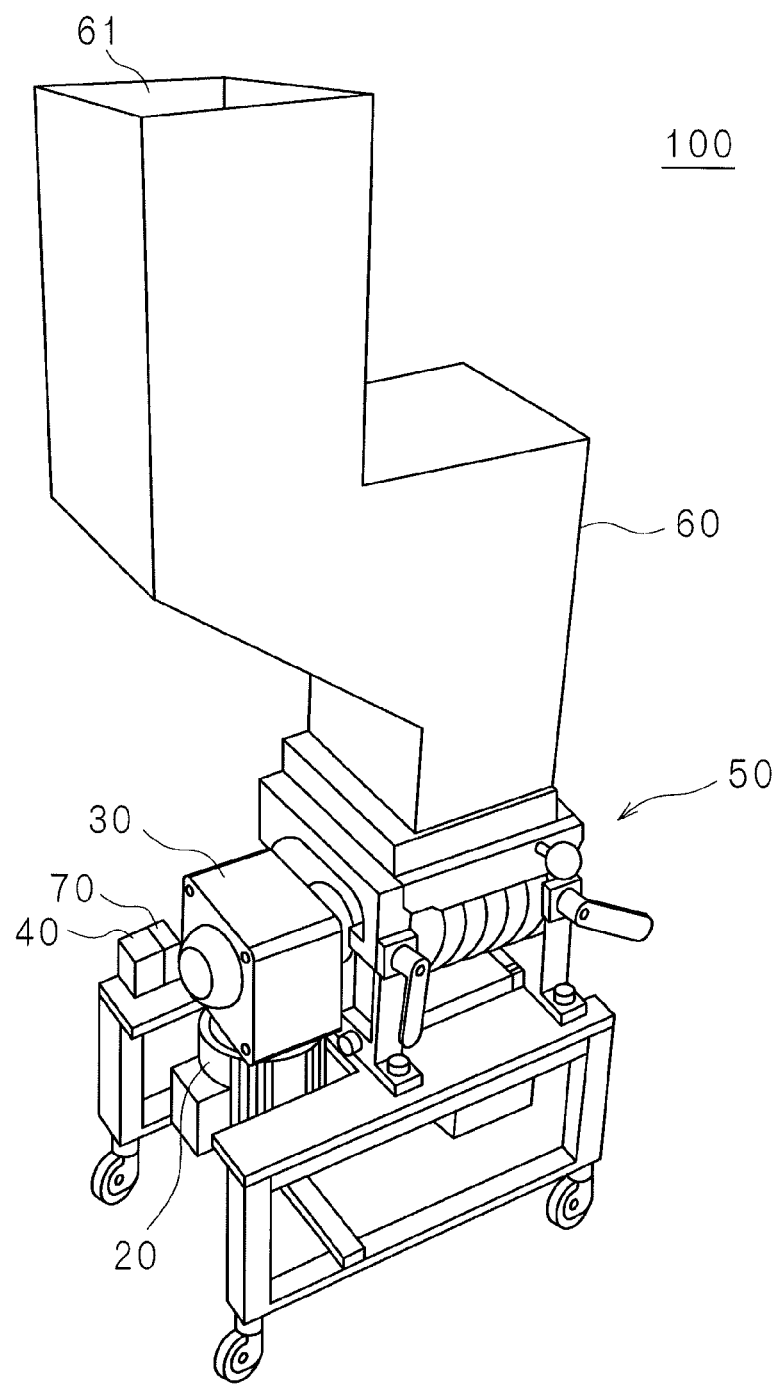
FIG. 1 is an appearance perspective view illustrating the outline of an installation example of a crusher including a drive control device according to Embodiment 1.

The present invention will now be described with reference to the accompanying drawings illustrating embodiments thereof. FIG. 1 is an appearance perspective view illustrating the outline of an installation example of a crusher 100 including a drive control device according to Embodiment 1. Herein, the crusher 100 will be described as an example of an electrical apparatus. It is noted that the electrical apparatus is not limited to the crusher 100. The crusher 100 includes: a crusher main body 50 equipped with a housing; an inverter 40 that converts the frequency (base frequency) of an AC power supply supplied from a commercial power supply of 50 Hz or 60 Hz and outputs an AC voltage of the converted frequency; a motor (electric motor) 20 driven by the AC voltage output from the inverter 40; a reduction gear 30 for reducing the rotational frequency of a motor shaft of the motor 20; a control unit 70 working as a drive control device for controlling the operation of the crusher 100, and the like. The crusher 100 has a rotating shaft transversely provided in the housing, and the rotating shaft is rotated at a rotational frequency reduced by the reduction gear 30. In the crusher 100, a processing object is crushed by cooperation of a rotary blade attached to the rotating shaft provided in the housing and a fixed blade disposed in the housing. Incidentally, although the control unit 70 corresponding to the drive control device is built in the crusher corresponding to the electrical apparatus in the structure assumed in the following description, the control unit 70 may be separated from the crusher as a separate device.

The crusher main body 50 is equipped with the housing opened upward and downward. The crusher main body 50 is fixed, with bolts or the like, on a metal support 1 having an opening at the center. Below the support 1, a material receiving section attached to a lower portion of the crusher main body 50 is provided.

Above the crusher main body 50, an inlet hopper 60 substantially in an S shape is provided. A lower edge of the inlet hopper 60 is provided with an opening/closing axis (not shown), and the crusher main body 50 can be opened upward by axially rotating the inlet hopper 60 by approximately 90 degrees. The inside of the inlet hopper 60 is open, so that a processing object (sprue runner) introduced through an inlet port 61 can be supplied to the crusher main body 50.

Figure 2:
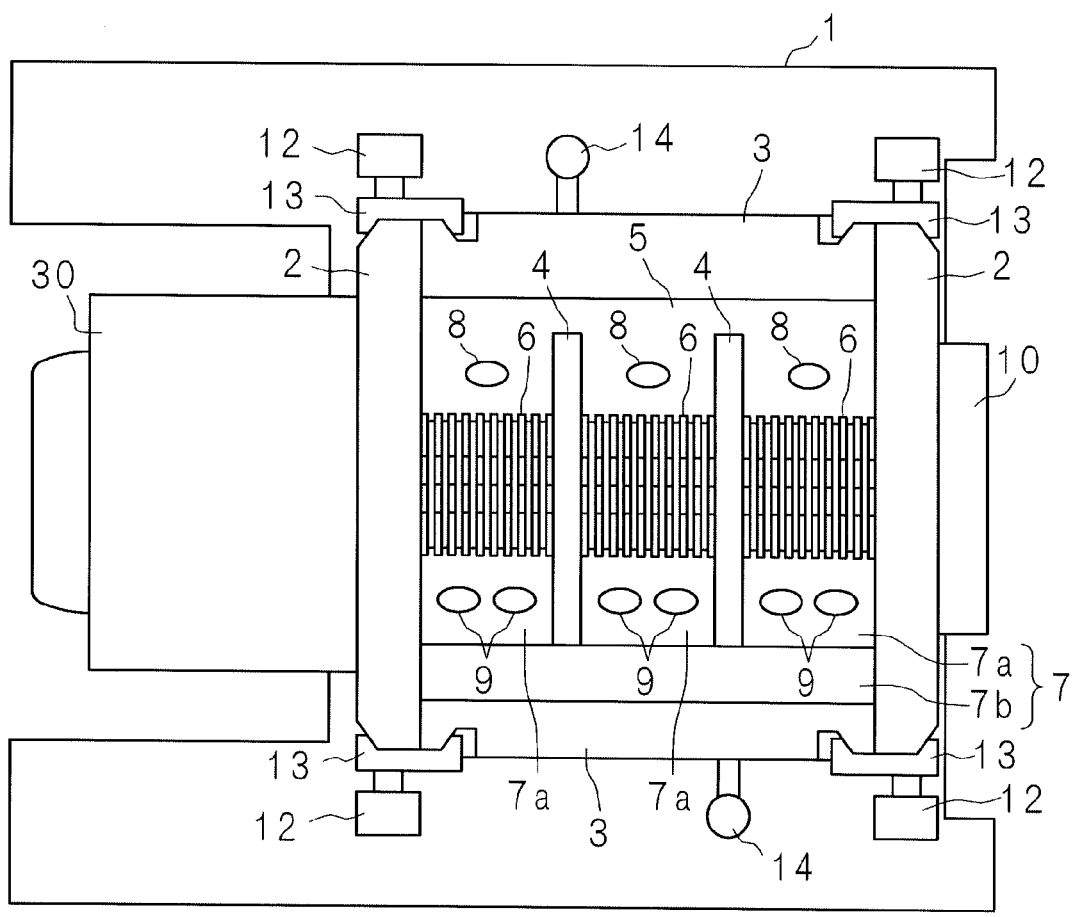
FIG. 2 is a principal part plan view of an example of a crusher main body according to Embodiment 1.

FIG. 2 is a principal part plan view of an example of the crusher main body 50 of Embodiment 1. As illustrated in FIG. 2, a pair of fixed metal sidewalls 2 spaced from each other by an appropriate distance are provided to oppose each other on the top surface of the support 1, a pair of metal rocking sidewalls 3 are provided to be sandwiched between side portions of the fixed sidewalls 2, and thus, the fixed sidewalls 2 and the rocking sidewalls 3 together construct the housing. The housing of the crusher main body 50 is opened upward and downward.

A bearing 10 is attached to a substantially center portion of one of the fixed sidewalls 2, and the motor 20 and the reduction gear 30 are attached to the other of the fixed sidewalls 2.

It is noted that the inverter 40 and the control unit 70 are omitted in FIG. 2. The reduction gear 30 includes a pinion, a wheel (gear) and the like, so as to reduce the rotational frequency of the motor shaft of the motor 20 and to rotate a rotating shaft (not shown) of the crusher main body 50 at the reduced rotational frequency. The rotating shaft is transversely provided between the fixed sidewalls 2. In this manner, the rotating shaft of the crusher main body 50 is rotated simultaneously with the motor shaft of the motor 20.

A space surrounded by the fixed sidewalls 2 and the rocking sidewalls 3 contains cracking blades 4 and grinding blades 6, used as rotary blades, fit in the rotating shaft. The cracking blades 4 are protruded, in an arch shape, beyond the circumferential surface of the rotating shaft. In other words, the cracking blades 4 are in arm shapes each having a tip (edge) portion curved toward the rotating direction and are arranged at appropriate intervals along the shaft direction of the rotating shaft. The grinding blades 6 are disposed between the fixed sidewall 2 and the cracking blade 4 and between the cracking blades 4, and have circular grooves that are formed at prescribed intervals along the rotating shaft direction and circular projections that are formed between the adjacent circular grooves and have outer peripheral surfaces in a sawtooth shape.

The rocking sidewalls 3 can be rocked around a rocking shaft (not shown) parallel to the rotating shaft, and the inside of the housing is opened upward by opening the rocking sidewalls 3. On the inner surface of one of the rocking sidewalls 3, a fixed blade 7 including rectangular plate-shaped first fixed blades 7a and second fixed blades 7b for crushing the processing object (sprue runner) together with the cracking blades 4 and the grinding blades 6 is fixed to be inclined downward inward.

The first fixed blade 7a has a lengthwise dimension substantially equal to the shaft direction dimension of the grinding blade 6, has, at one edge along the lengthwise direction, a tooth portion in an irregular shape to be meshed with the blade edge of the grinding blade 6, and is fixed on the inner surface of the rocking sidewall 3 with bolts 9. The first fixed blade 7a also has, at an edge along the widthwise direction and close to the cracking blade 4, a tooth portion for crushing the processing object together with the cracking blade 4.

The second fixed blade 7b has a lengthwise dimension substantially equal to the shaft direction dimension of the rocking sidewall 3, and has, at one edge along the lengthwise direction and close to the cracking blade 4, a tooth portion for crushing the processing object together with the cracking blade 4. The second fixed blade 7b is fixed on the inner surface of the rocking sidewall 3 with bolts (not shown) so as to be in contact with the other edges of the first fixed blades 7a along the lengthwise direction.

A cracking blade cover (not shown) is provided inside the rocking sidewall 3 below the fixed blade 7 so that the processing object having been primarily crushed by the cracking blades 4 but not crushed into a desired size yet can be prevented from being discharged. The cracking blade cover is provided with arch-shaped grooves formed inside thereof so as to cover the rotational orbits of the cracking blades 4.

On the inner surface of the other rocking sidewall 3, a scraper 5 in a substantially rectangular plate shape for scraping off a crushed material having been crushed by the grinding blades 6 into a prescribed size (in a grain shape) and discharging it to the material receiving section disposed below the housing is fixed with bolts 8 to be inclined downward inward.

The scraper 5 has rectangular notches in portions where the cracking blades 4 are rotated, and has, at one edge along the lengthwise direction and close to the grinding blades 6, a scraping section in an irregular shape to be meshed with the blade edges of the grinding blades 6.

Another cracking blade cover is provided on the inner surface of the rocking sidewall 3 below the scraper 5 so that the processing object having been primarily crushed by the cracking blades 4 but not crushed into a prescribed size yet can be prevented from being discharged. The cracking blade cover is provided with arch-shaped grooves formed inside thereof so as to cover the rotational orbits of the cracking blades 4. When the both rocking sidewalls 3 are closed, the respective cracking blade covers come into contact with each other at one end portions thereof to together form a space covering the rotational orbits of the cracking blades 4, and thus, an uncrushed portion of the processing object can be prevented from being discharged.

At four corners of the housing constructed by the fixed sidewalls 2 and the rocking sidewalls 3, rocking members 13 each having one tapered surface for fixing the rocking sidewall 3 onto the fixed sidewall 2 are provided, so that the rocking sidewalls 3 can be fixed on the fixed sidewalls 2 by fastening levers 12 screwed in the rocking members 13 with the ends of the fixed sidewalls 2 and the rocking sidewalls 3 sandwiched between the tapered surfaces. Each of the rocking sidewalls 3 can be opened/closed by grasping a handle 14 fixed on the rocking sidewall 3.

When the processing object is to be crushed, the levers 12 are fastened to fix the rocking sidewalls 3 onto the fixed sidewalls 2. After the processing object is introduced into the inlet hopper 60 disposed above the housing, when the inverter 40 is turned on, the rotating shaft is rotated at a prescribed rotational frequency to rotate the cracking blades 4 and the grinding blades 6. With respect to the rotating direction, the cracking blades 4 and the grinding blades 6 are meshed with the fixed blades 7 in moving in the downward direction and meshed with the scraper 5 in moving in the upward direction.

In this manner, the processing object is first primarily crushed by cooperation of the cracking blades 4 and the fixed blades 7 into a size that can be easily bit by the grinding blades 6. The thus primarily crushed processing object is then crushed into a crushed material with a prescribed size by cooperation of the grinding blades 6 and the first fixed blades 7a, and the crushed material is fed to a lower portion of the housing in accordance with the rotation of the grinding blades 6 to be discharged to the material receiving section. Besides, a portion of the crushed material having been crushed into the prescribed size and adhered to side surfaces of the grinding blades 6 due to static electricity is scraped off with a lower surface of the scraper 5 by cooperation of the grinding blades 6 and the scraper 5 so as to be discharged to the material receiving section.

A part of the processing object primarily crushed by the cracking blades 4 is fed to a portion below the fixed blade 7 by the rotation of the cracking blades 4, but caught by the cracking blade cover, so as to be fed to a portion above the grinding blades 6 again and be prevented from being discharged to the material receiving section in error.

Figure 3:
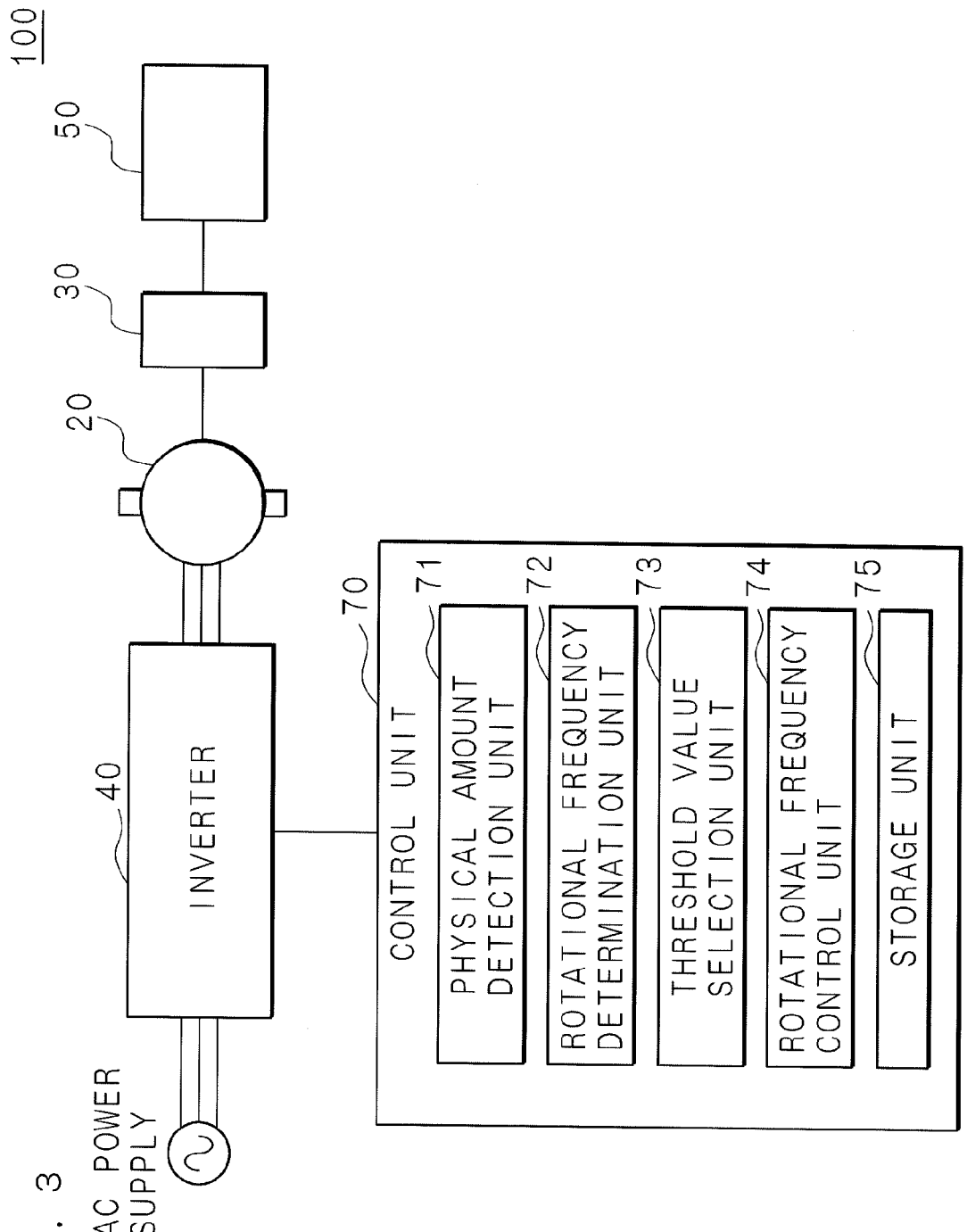
FIG. 3 is a block diagram of an example of a circuit configuration of the crusher of Embodiment 1.

FIG. 3 is a block diagram of an example of a circuit configuration of the crusher 100 of Embodiment 1. As illustrated in FIG. 3, the invert 40 converts an AC voltage of 50 Hz or 60 Hz into a desired frequency and supplies an output voltage of the converted frequency to the motor 20. The motor 20 is, for example, an induction electric motor and is driven in accordance with the AC voltage supplied from the inverter 40. The rotational frequency of the motor shaft of the motor 20 is reduced by the reduction gear 30, and the rotating shaft of the crusher main body 50 is rotated at a rotational frequency reduced by the reduction gear 30.

The inverter 40 acquires a physical amount pertaining to the output of the motor 20 and outputs the acquired physical amount to the control unit 70. The physical amount pertaining to the output of the motor 20 is, for example, a torque (driving torque), a torque current, a load current, an output power or the like of the motor 20. If the torque current of the motor 20 or the load current of the electric motor is detected as the physical amount, the detected torque current or load current may be converted into a torque. It is not necessary for the inverter 40 to output all the aforementioned physical amounts but may output at least one of the torque, the torque current, the load current and the output power. In the following description, a feature amount pertaining to the torque is the torque or the torque current of the motor 20, the load current of the motor, or the like.

The inverter 40 can acquire the torque of the motor 20 in accordance with the output current to be output to the motor 20. More specifically, since the output current of the motor 20 is a sum of a torque current (active current) component according to the torque of the motor 20 and a reactive current component not attributed to the torque, the torque of the motor 20 can be obtained on the basis of the torque current obtained by subtracting the reactive current component from the output current.

Figure 4:
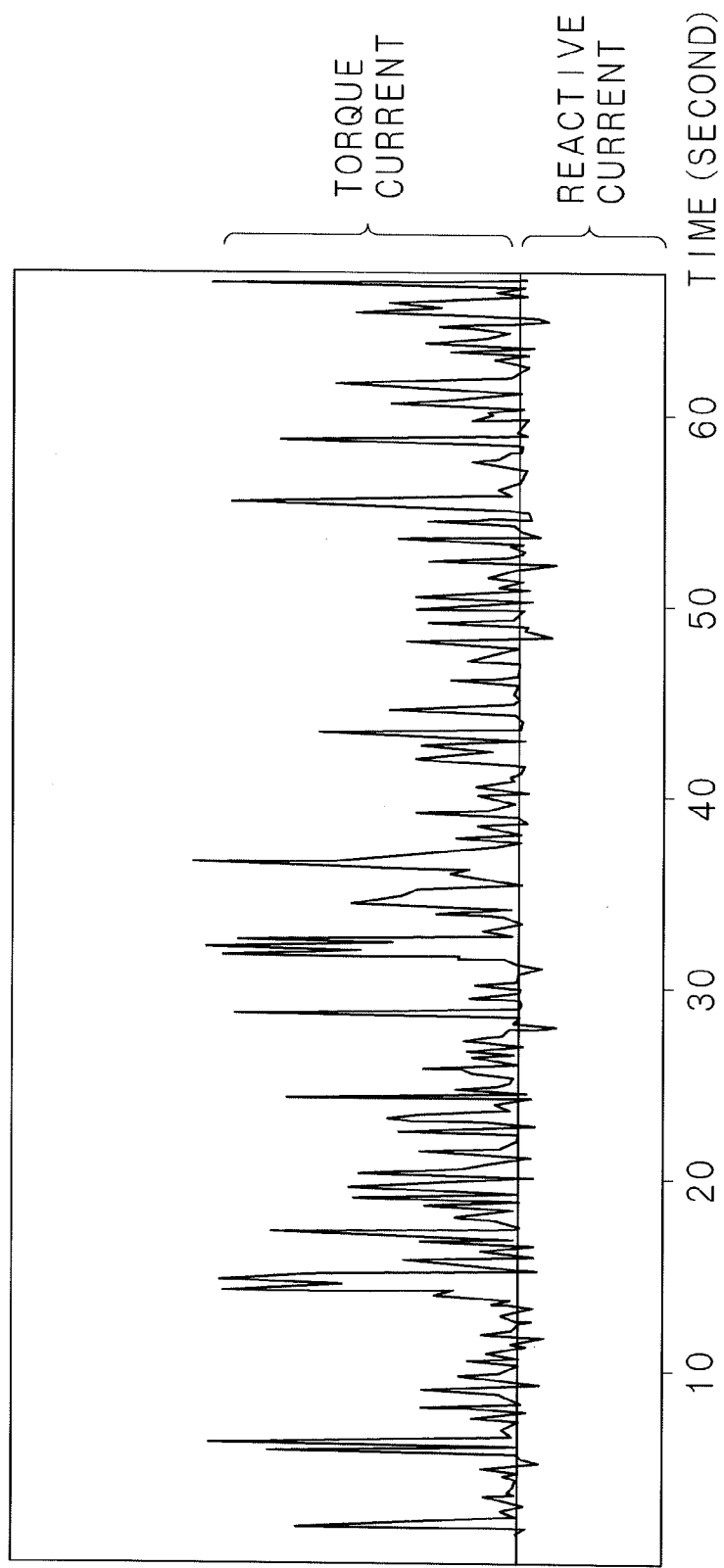
FIG. 4 is a time chart illustrating an example of an output current waveform of an inverter.

FIG. 4 is a time chart illustrating an example of an output current waveform of the inverter 40. In FIG. 4, the abscissa indicates time and the ordinate indicates the output current of the inverter 40. The output current of the inverter 40 can be expressed as a sum of a reactive current obtained under no-load state where the crusher main body 50 is not crushing a processing object and a torque current (active current) obtained under load state where it is crushing a processing object. In the example illustrated in FIG. 4, it is understood that the torque current is varied over time so as to vary a torque caused in crushing the processing object. It is noted that this waveform of the output current is described merely as an example and the waveform is not limited to the example illustrated in FIG. 4.

A relationship between the output frequency of the inverter 40 and the rotational frequency of the motor shaft can be expressed as Vf=120×F/S. Here, Vf is the rotational frequency of the motor shaft of the motor 20, S is the number of poles of the motor 20, and F is the output frequency of the inverter 40. If, for example, the motor 20 has 4 poles and the output frequency F of the inverter 40 is 50 Hz, the rotational frequency Vf of the motor shaft is 1500 rpm, and if the output frequency F of the inverter 40 is 60 Hz, the rotational frequency Vf of the motor shaft is 1800 rpm.

The reduction gear ratio of the reduction gear 30 is, for example, 1/160, and the ratio of reduction is thus larger than a reduction gear ratio (of, for example, 1/80) of a conventional reduction gear.

Figure 6:
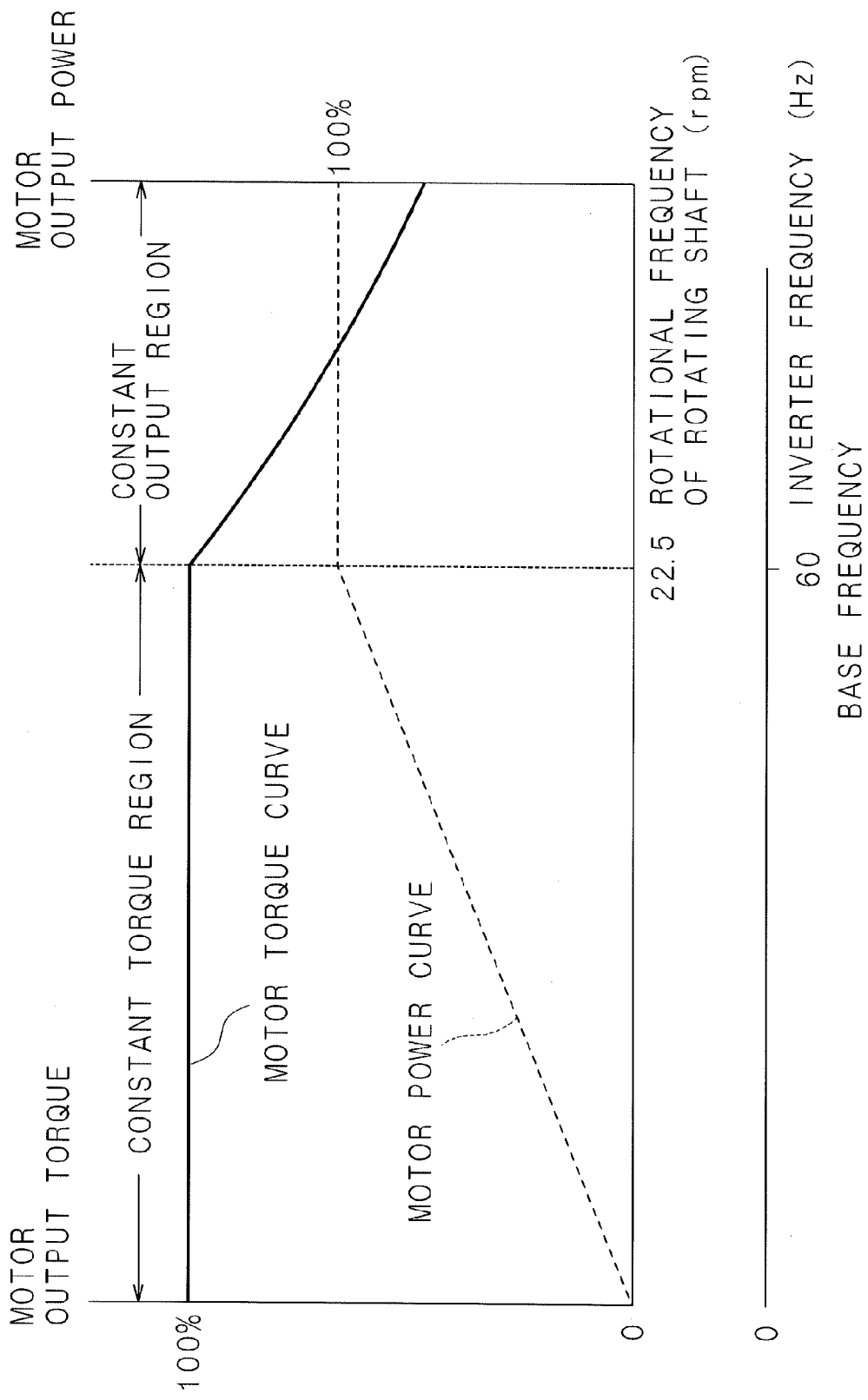
FIG. 6 is an explanatory diagram illustrating an example of the output characteristic of a conventional inverter-controlled motor.

Next, the output characteristic of an inverter-controlled motor will be described. FIG. 5 is an explanatory diagram illustrating a relationship between the rotational frequency of a rotating shaft and the frequency of an inverter in a conventional crusher, and FIG. 6 is an explanatory diagram illustrating an example of the output characteristic of a conventional inverter-controlled motor. As illustrated in FIG. 5, a reduction gear with a reduction gear ratio of approximately 1/80 is conventionally used. If the base frequency of the output voltage of the inverter is 50 Hz, the rotational frequency (base rotational frequency) of the motor shaft of a 4-pole motor is 1500 rpm, and the rotational frequency of the rotating shaft of a crusher reduced at a reduction gear ratio of 1/80 is 18.75 rpm. Alternatively, if the base frequency of the output voltage of the inverter is 60 Hz, the rotational frequency (base rotational frequency) of the motor shaft of a 4-pole motor is 1800 rpm, and the rotational frequency of the rotating shaft of a crusher reduced at a reduction gear ratio of 1/80 is 22.5 rpm.

In FIG. 6, the abscissa indicates the frequency of the inverter and the rotational frequency of the rotating shaft of the crusher, and the ordinate indicates the output torque and the output power of the motor. As illustrated in FIG. 6, the output characteristic of the motor is changed at a rotational frequency of 22.5 rpm, namely, the rotational frequency of the rotating shaft of the crusher corresponding to the base rotational frequency of 1800 rpm of the motor shaft of the motor obtained when the frequency (base frequency) of the inverter is 60 Hz. At a frequency equal to or lower than the base frequency, namely, the base rotational frequency (corresponding to the rotational frequency of 22.5 rpm of the rotating shaft), a constant torque characteristic is shown, and at a frequency equal to or greater than the base rotational frequency, a constant output characteristic is shown.

As illustrated as a torque curve (torque characteristic) of the motor with a solid line in FIG. 6, the torque of the motor is constant in a constant torque region and is gradually lowered, in a constant output region, as the frequency of the inverter is increased. On the torque curve of the motor in the constant output region, the output power of the motor is constant.

Besides, as illustrated as a power curve (output power characteristic) of the motor with a broken line in FIG. 6, the output power of the motor is gradually increased, in the constant torque region, as the frequency of the inverter is increased, and is constant in the constant output region. It is gradually lowered, in the constant output region, as the frequency of the inverter is increased. On the power curve of the motor in the constant torque region, the torque of the motor is constant.

In the conventional crusher, the reduction gear ratio of the reduction gear is approximately 1/80 for obtaining a sufficiently large torque in order to cope with load variation caused in various loads while retaining the rotational frequency of the rotating shaft at a given frequency or higher for increasing the grinding capacity. This is for the following reason: If the reduction gear ratio is further increased (namely, if the ratio of reduction is further increased), the rotational frequency of the rotating shaft of the crusher corresponding to the base rotational frequency of the motor is reduced, and hence, a frequency range where the constant torque characteristic can be obtained is narrowed. In addition, when the rotational frequency of the rotating shaft is increased, the constant output characteristic is shown, and hence a sufficiently large torque cannot be attained.

Figure 7:
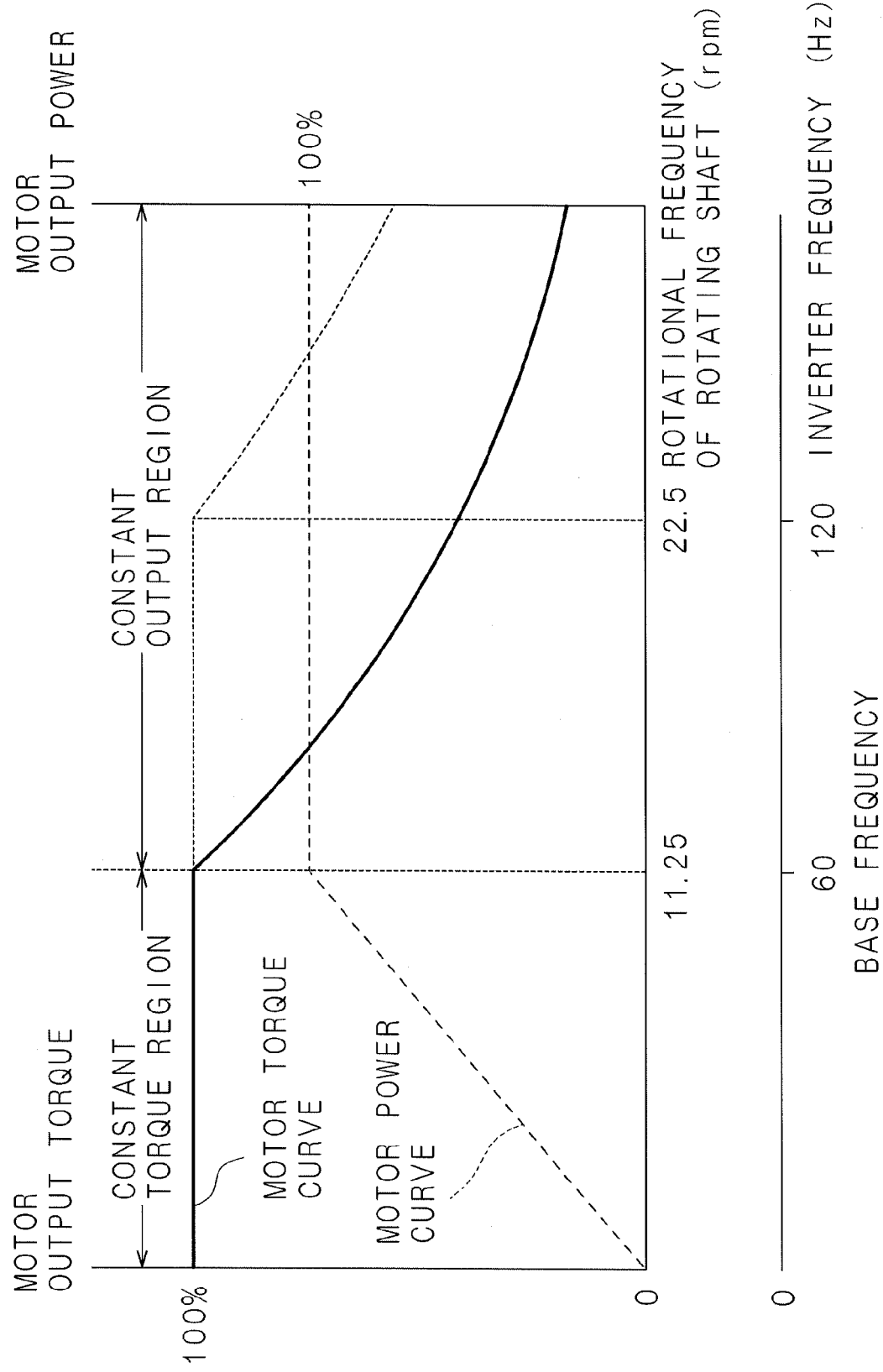
FIG. 7 is an explanatory diagram illustrating an example of the output characteristic of a motor of the crusher of Embodiment 1.

FIG. 7 is an explanatory diagram illustrating an example of the output characteristic of the motor 20 of the crusher 100 of Embodiment 1. In FIG. 7, the abscissa indicates the frequency of the inverter 40 and the rotational frequency of the rotating shaft of the crusher 100, and the ordinate indicates the output torque and the output power of the motor 20. In FIG. 7, a solid line corresponds to a torque curve (torque characteristic) of the motor 20 of the crusher 100 of Embodiment 1, and a broken line corresponds to a power curve (output power characteristic) of the motor 20 of the crusher 100. Also, a thin broken line corresponds to the torque curve (torque characteristic) of the motor of the conventional crusher exemplified in FIG. 6.

As illustrated with the thin broken line in FIG. 7, the motor of the conventional crusher shows the constant torque characteristic when the rotational frequency of the rotating shaft of the crusher is equal to or lower than 22.5 rpm, and shows the constant output characteristic, with the torque lowered as the rotational frequency is increased, when it is equal to or higher than 22.5 rpm. The conventional crusher is operated with the constant torque characteristic so as to always attain the maximum torque in anticipation of load variation, but the crusher is very rarely operated in the vicinity of the maximum torque in a usual operation, and is designed to be always operated with a margin. Therefore, a motor with a large capacity (of, for example, 0.75 kW) is operated at a low load ratio, and thus, a sufficient energy-saving operation cannot be performed.

On the other hand, as illustrated with a solid line in FIG. 7, the motor 20 of the crusher 100 of Embodiment 1 includes the reduction gear 30 with a reduction gear ratio of 1/160, which is higher than the conventional reduction gear ratio of 1/80. Therefore, if the base frequency of the inverter 40 is 60 Hz and the motor shaft of the motor 20 is rotated at a base rotational frequency of 1800 rpm, the rotational frequency of the rotating shaft of the crusher 100 is 11.25 rpm. In other words, the motor 20 of the crusher 100 of Embodiment 1 shows the constant torque characteristic and can output the torque equivalent to that of the conventional crusher when the rotational frequency of the rotating shaft of the crusher 100 is equal to or lower than 11.25 rpm, but when the rotational frequency is equal to or higher than 11.25 rpm, it shows the constant output characteristic, with the torque lowered as the rotational frequency is increased. Besides, the capacity (rating) of the motor 20 of Embodiment 1 is 0.4 kW, which is smaller than the capacity of the motor used in the conventional crusher. It is noted that this capacity (rating) of the motor 20 is merely an example and the capacity is not limited to 0.4 kW.

The control unit 70 includes, for example, a physical amount detection unit 71 for detecting a physical amount pertaining to the output of the motor 20; a rotational frequency determination unit 72 for determining whether or not the rotational frequency of the motor shaft of the motor 20 is equal to or higher than the base rotational frequency; a threshold value selection unit 73 for selecting a threshold value for the physical amount in accordance with the determination result of the rotational frequency determination unit 72; a rotational frequency control unit 74 for controlling the rotational frequency of the rotating shaft of the crusher main body 50 by controlling the frequency of the AC power supply output by the inverter 40; and a storage unit 75 for storing prescribed information including the threshold value for the physical amount.

The physical amount detection unit 71 detects the physical amount output from the inverter 40. The physical amount is, for example, a torque (driving torque), a torque current, a load current, an output power and the like of the motor 20. It is noted that the physical amount detection unit 71 may detect at least one of the torque, the torque current, the load current and the output power of the motor 20. Incidentally, in employing a configuration in which the inverter 40 does not output the physical amount, the physical amount detection unit 71 may detect the physical amount from another component (such as the motor 20) apart from the inverter 40.

The rotational frequency determination unit 72 determines whether or not the rotational frequency of the motor shaft of the motor 20 is equal to or greater than the base rotational frequency. The base rotational frequency is a synchronous rotational frequency determined depending upon the base frequency (of, for example, 50 Hz or 60 Hz) output from the inverter 40 to the motor 20 and the number of poles of the motor 20. Since the base rotational frequency of the motor 20 and the base frequency of the inverter 40 are uniquely determined, the determination made by the rotational frequency determination unit 72 whether or not the rotational frequency of the motor 20 is equal to or greater than the base rotational frequency has the same meaning as determination whether or not the frequency of the inverter 40 is equal to or greater than the base frequency.

As illustrated in FIG. 7, the output characteristic of the motor 20 controlled by the inverter 40 shows the constant torque characteristic at a rotational frequency equal to or lower than the base rotational frequency (namely, at a frequency equal to or lower than the base frequency), and shows the constant output characteristic (constant output power characteristic) at a rotational frequency equal to or greater than the base rotational frequency (at a frequency equal to or greater than the base frequency). In other words, the rotational frequency determination unit 72 determines whether the motor 20 is operated in the constant torque region or in the constant output region.

Incidentally, the determination whether or not the rotational frequency is equal to or greater than the base rotational frequency (base frequency) may be made with the base rotational frequency (base frequency) itself set as the boundary, or alternatively, a prescribed allowable range may be provided with the base rotational frequency (base frequency) set as the center so as to make the determination by determining whether the rotational frequency is higher or lower than boundaries of the allowable range. Assuming that the base frequency is, for example, 60 Hz, any of a method for determining whether or not the rotational frequency is equal to or greater than 60 Hz, a method for determining whether or not it is equal to or greater than 60 Hz-20 Hz=40 Hz, and a method for determining whether or not it is equal to or greater than 60 Hz+20 Hz=80 Hz may be employed.

The threshold value selection unit 73 selects a threshold value for the physical amount in accordance with the determination result of the rotational frequency determination unit 72.

Figure 8:
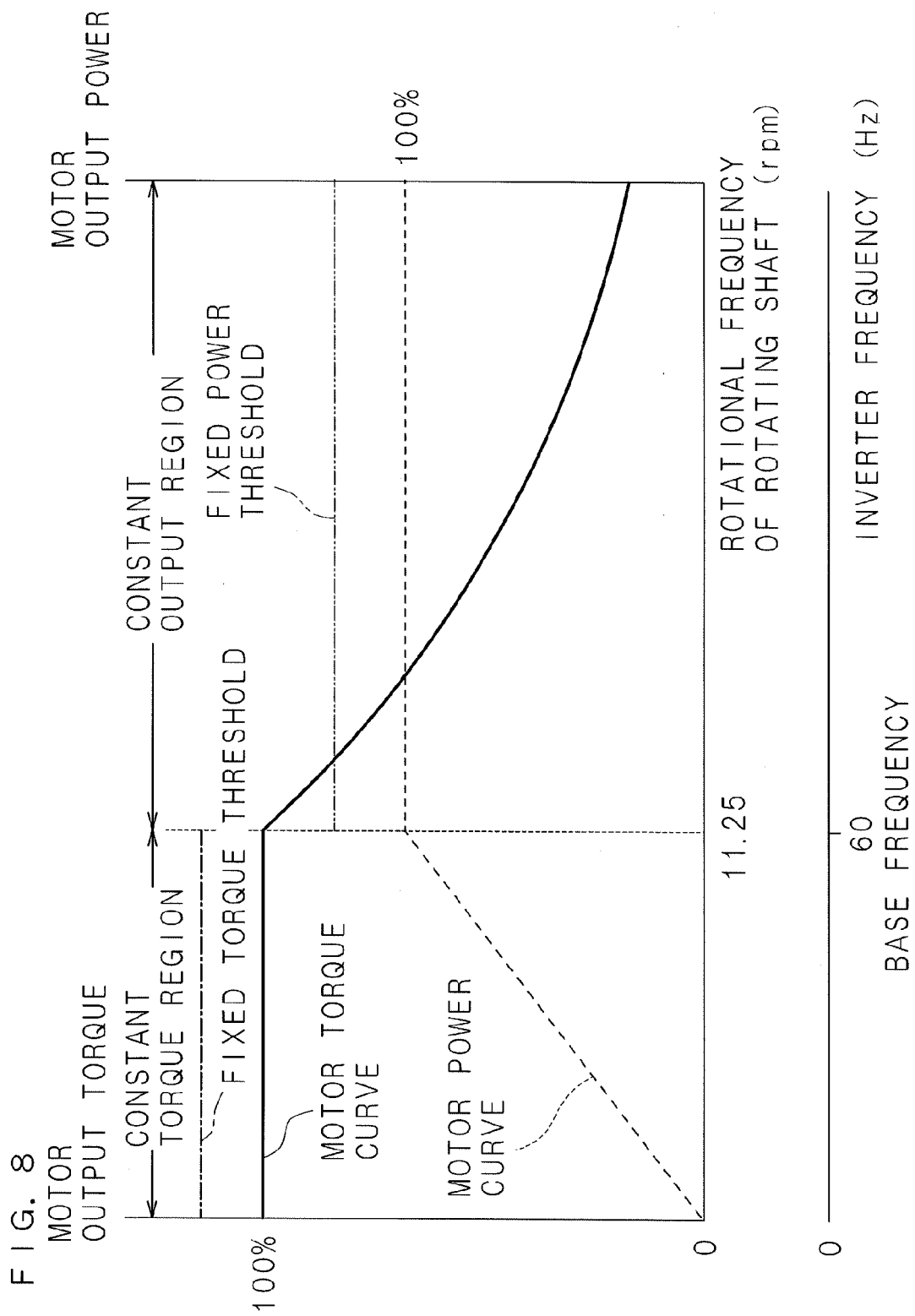
FIG. 8 is an explanatory diagram illustrating an example of selection of a threshold value of the crusher of Embodiment 1.

FIG. 8 is an explanatory diagram illustrating an example of the selection of a threshold value of the crusher 100 of Embodiment 1. As illustrated in FIG. 8, if it is determined, for example, that the rotational frequency of the motor 20 is equal to or greater than the base rational frequency (i.e., the frequency of the inverter 40 is equal to or greater than the base frequency) (namely, it is determined that the motor 20 is operated in the constant output region), a power threshold value for the output power (physical amount) of the motor 20 is selected. If the motor 20 is operated in the constant output region, the output power of the motor 20 is constant, and hence, a fixed (specific) power threshold value can be used.

Alternatively, if it is determined that the rotational frequency of the motor 20 is not equal to or greater than the base rotational frequency (i.e., the frequency of the inverter 40 is not equal to or greater than the base frequency) (namely, it is determined that the motor 20 is operated in the constant torque region), a torque threshold value for the torque (physical amount) of the motor 20 is selected. In the case where the motor 20 is operated in the constant torque region, the torque of the motor 20 is constant, and hence, a fixed (specific) torque threshold value can be used. It is noted that the power threshold value and the torque threshold value are precedently stored in the storage unit 75.

The rotational frequency control unit 74 controls the rotational frequency of the rotating shaft of the crusher main body 50 in accordance with a magnitude relationship between the physical amount detected by the physical amount detection unit 71 and the threshold value selected by the threshold value selection unit 73. Specifically, if the motor 20 is operated in the constant output region, the output power of the motor 20 is detected as the physical amount, so that the rotational frequency of the motor 20 can be controlled in accordance with the magnitude relationship between the detected output power and the power threshold value.

Incidentally, the frequency of the output voltage of the inverter 40, the rotational frequency of the motor shaft of the motor 20 and the rotational frequency of the rotating shaft of the crusher main body 50 are uniquely determined, and if any one of them is changed, the others are simultaneously changed. Therefore, the control of the rotational frequency of the rotating shaft of the crusher main body 50 by the rotational frequency control unit 74 has the same meaning as the control of the frequency of the output voltage of the inverter 40 or the control of the rotational frequency of the motor shaft of the motor 20. In the present embodiment, the control of the rotational frequency of the rotating shaft of the crusher main body 50, the control of the frequency of the output voltage of the inverter 40 and the control of the rotational frequency of the motor shaft of the motor 20 are assumed to have the same meaning.

The torque Tr of the motor 20 can be expressed as Tr=a× Pw/Vf. Here, a is a coefficient determined in accordance with the structure of the motor 20, Pw is the output power of the motor 20, and Vf is the rotational frequency of the motor shaft of the motor 20. If the torque of the motor 20 operated in the constant output region is varied due to a load state, the output power of the motor 20 is varied assuming that the rotational frequency of the motor 20 is not changed. Therefore, if the detected output power is smaller than the power threshold value, the load is low, and hence, the rotational frequency of the rotating shaft of the crusher main body 50 is increased for increasing the grinding capacity. Alternatively, if the detected output power is larger than the power threshold value, the load is high, and hence, the torque is increased by lowering the rotational frequency for preventing overload stop.

On the other hand, if the motor 20 is operated in the constant torque region, the torque (or the torque current, the load current or the like related to the torque) of the motor 20 is detected as the physical amount, and the rotational frequency of the rotating shaft of the crusher main body 50 is controlled in accordance with a magnitude relationship between the detected torque and a torque threshold value.

As described above, if the motor 20 is operated at a rotational frequency equal to or greater than the base rotational frequency, for controlling the rotational frequency in accordance with the load state, the rotational frequency of the motor 20 can be controlled in accordance with the load merely by comparing the magnitudes of the detected output power (physical amount) and the power threshold value. Therefore, for example, an inverter of a relatively low cost that outputs merely the output power of the motor 20 can be used for controlling the rotational frequency of the electrical apparatus. Furthermore, since the value of a torque is changed in accordance with the rotational frequency in the constant output region of the motor 20, it is necessary to use different threshold values in accordance with the rotational frequency of the motor 20 for the comparison of a detected torque value and a threshold value. Accordingly, for controlling the rotational frequency of the motor 20, it is necessary to calculate a threshold value in accordance with the rotational frequency, which increases the cost due to addition of a configuration for the calculation. Since the magnitudes of the detected output power (physical amount) and the power threshold value are compared, there is no need to calculate a threshold value for the torque, which reduces the cost, and thus, a simple configuration can be employed for controlling the rotational frequency of the electrical apparatus in accordance with the load characteristic.

The threshold value selected by the threshold value selection unit 73 can be a fixed (specific) value. Specifically, the physical amount detection unit 71 detects the output power of the motor 20, and if the rotational frequency of the motor 20 is equal to or greater than the base rotational frequency (namely, if the motor 20 is operated in the constant output region), the threshold value selection unit 73 selects a power threshold value of a fixed value. The rotational frequency control unit 74 controls the rotational frequency of the rotating shaft of the crusher main body 50 in accordance with a magnitude relationship between the detected output power and the power threshold value of the fixed value. If the motor 20 is operated at a rotational frequency equal to or greater than the base rotational frequency, for controlling the rotational frequency in accordance with the load state, the rotational frequency of the motor 20 can be controlled in accordance with the load merely by comparing the magnitudes of the detected output power (physical amount) and the power threshold value of the fixed value. Therefore, there is no need to calculate a threshold value, and hence, a simple configuration can be employed for controlling the rotational frequency of the electrical apparatus in accordance with the load characteristic.

Furthermore, the physical amount detection unit 71 detects a feature amount pertaining to the torque of the motor 20. The feature amount pertaining to the torque is a torque, a torque current, a load current or the like. If the rotational frequency of the motor 20 is not equal to or greater than the base rotational frequency (namely, the motor 20 is operated in the constant torque region), the threshold value selection unit 73 selects a torque amount threshold value of a fixed value. The rotational frequency control unit 74 controls the rotational frequency of the rotating shaft of the crusher main body 50 in accordance with a magnitude relationship between the detected feature amount and the torque amount threshold value of the fixed value. If the motor 20 is operated at a rotational frequency equal to or lower than the base rotational frequency, for controlling the rotational frequency in accordance with the load state, the rotational frequency of the motor 20 can be controlled in accordance with the load merely by comparing the magnitudes of the detected feature amount (physical amount) pertaining to the torque and the torque threshold value of the fixed value. Accordingly, there is no need to calculate a threshold value, and a simple configuration can be employed for controlling the rotational frequency of the electrical apparatus in accordance with the load characteristic.

Embodiment 2

Figure 9:
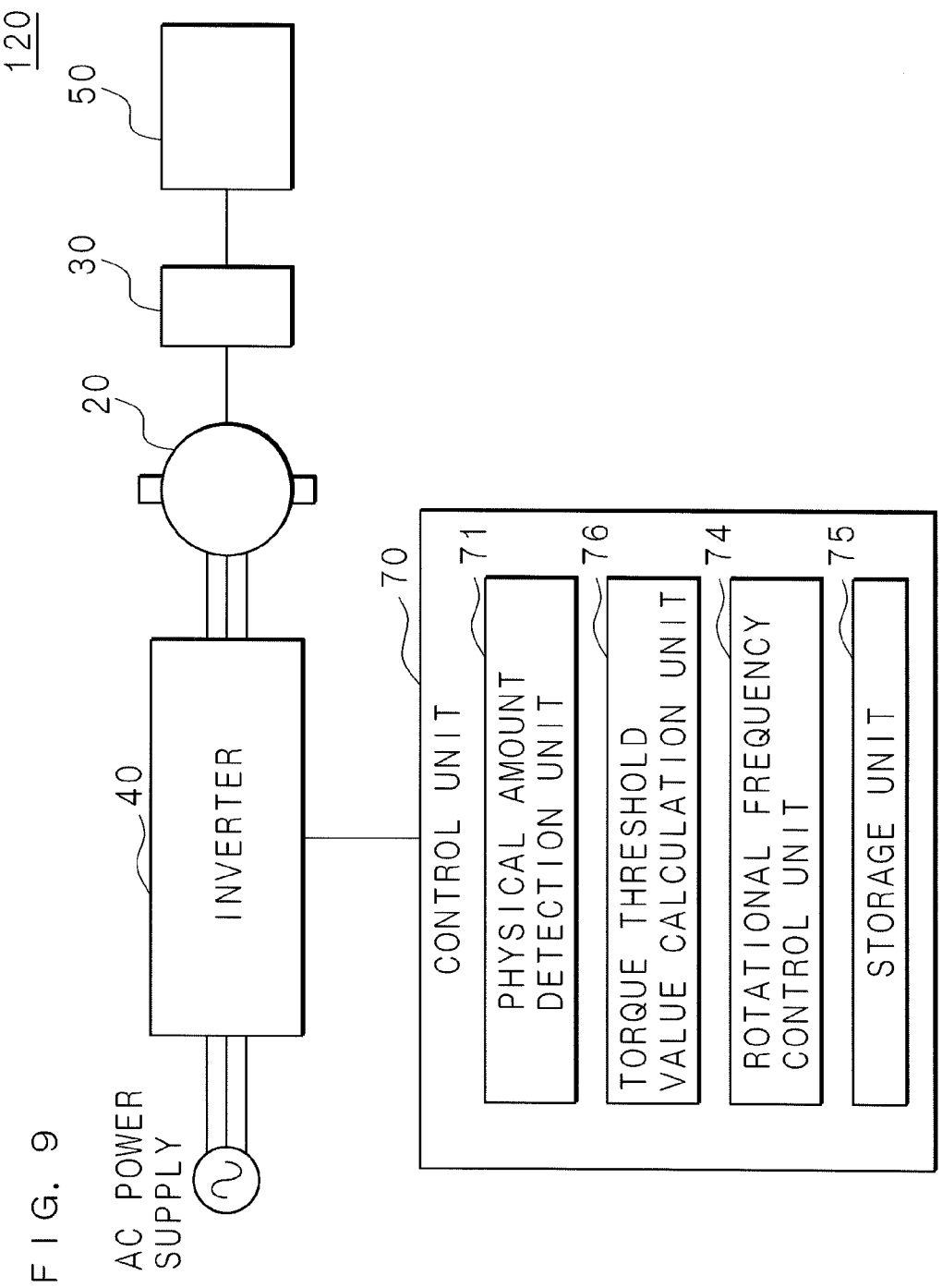
FIG. 9 is a block diagram of an example of a circuit configuration of a crusher according to Embodiment 2.

FIG. 9 is a block diagram of an example of a circuit configuration of a crusher 120 according to Embodiment 2. Differently from the crusher 100 of Embodiment 1, the crusher of this embodiment includes a torque threshold value calculation unit 76 instead of the rotational frequency determination unit 72 and the threshold value selection unit 73. Although the threshold value is selected in Embodiment 1, a torque threshold value is calculated in Embodiment 2.

A physical amount detection unit 71 detects a feature amount pertaining to the torque of a motor 20. The feature amount pertaining to the torque is, for example, a torque itself, a torque current, a load current or the like of the motor 20. If the torque current of the motor 20 or the load current of the electric motor is detected as the feature amount, the detected torque current or load current may be converted into a torque.

In operating the motor 20 at a frequency equal to or greater than the base rotational frequency, a rotational frequency control unit 74 controls the rotational frequency of a rotating shaft of a crusher main body 50 in accordance with a magnitude relationship between the detected feature amount and a feature amount threshold value.

The output characteristic of the motor 20 controlled by an inverter 40 shows a constant torque characteristic at a rotational frequency equal to or lower than the base rotational frequency, and shows a constant output characteristic (constant output power characteristic) at a rotational frequency equal to or greater than the base rotational frequency. If the motor 20 is operated at a rotational frequency equal to or greater than the base rotational frequency, namely, if the motor 20 is operated in the constant output region, the rotational frequency control unit 74 controls the rotational frequency of the rotating shaft of the crusher main body 50 in accordance with a magnitude relationship between the detected feature amount pertaining to the torque and a feature amount threshold value (such as a torque threshold value, a torque current threshold value or a load current threshold value). Incidentally, a torque threshold value can be set in a range with a given width between a maximum instantaneously outputtable torque including inertia of a rotor of an electrical apparatus and a continuously outputtable torque.

If, for example, the detected feature amount pertaining to the torque is smaller than the feature amount threshold value, the load is low, and hence, the rotational frequency of the rotating shaft of the crusher main body 50 is increased for increasing the grinding capacity. Alternatively, if the detected feature amount pertaining to the torque is larger than the feature amount threshold value, the load is high, and hence, the torque is increased by lowering the rotational frequency for preventing the overload stop. In this manner, a torque characteristic in accordance with the load characteristic can be realized and the maximum grinding capacity can be attained, and the torque can be changed in accordance with load variation. Therefore, there is no need to precedently provide an electric motor with a large capacity (a large rated value), and there is no need to operate an electric motor with a large capacity at a low load ratio, and hence, an inexpensive motor with a low capacity can be used and the energy can be saved. Besides, the rotational frequency of the electrical apparatus can be controlled in accordance with the load characteristic.

Figure 10:
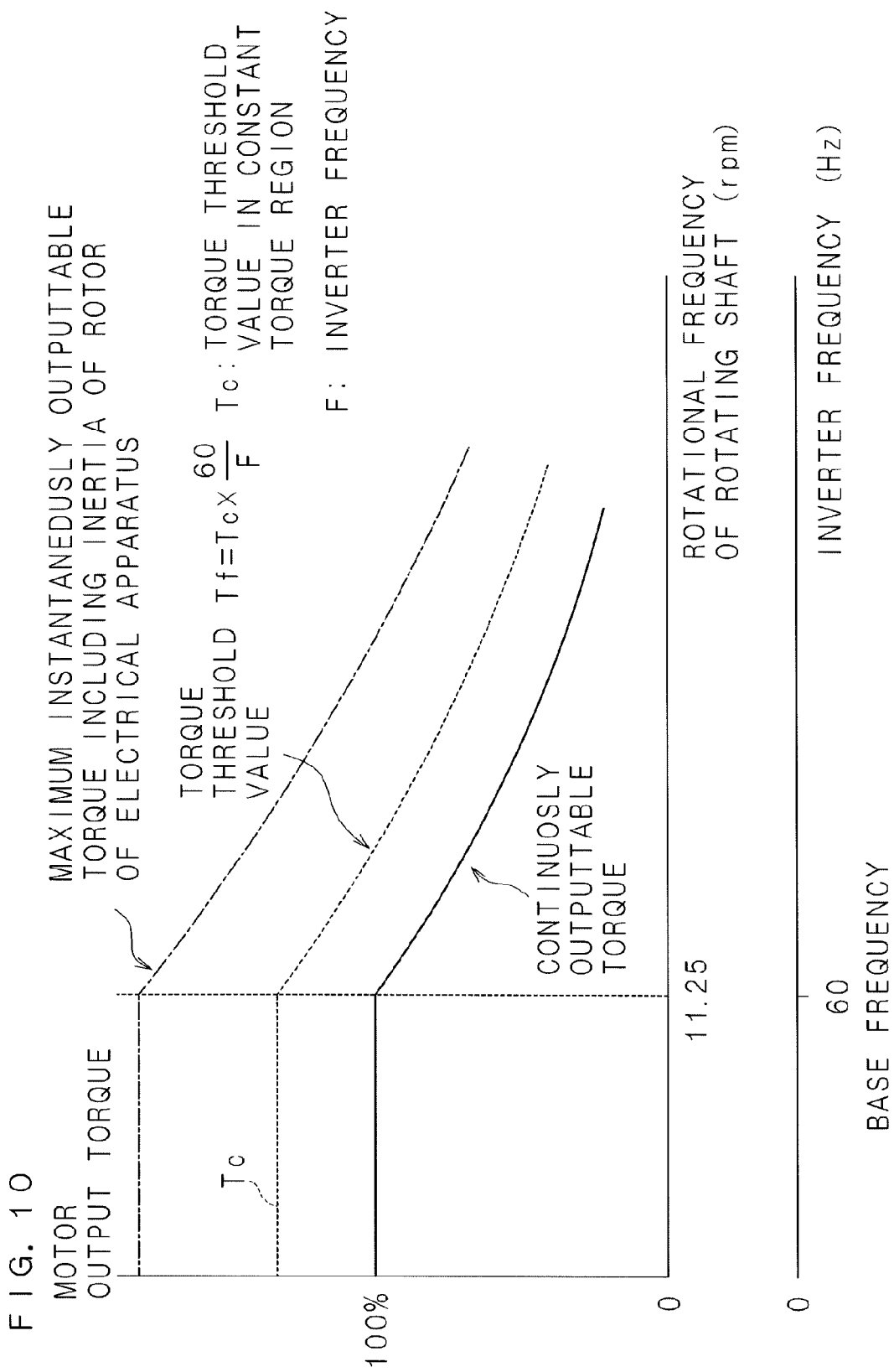
FIG. 10 is an explanatory diagram illustrating an example of a torque threshold value of the crusher of Embodiment 2.

FIG. 10 is an explanatory diagram illustrating an example of the torque threshold value of the crusher 120 of Embodiment 2. In FIG. 10, the abscissa indicates the rotational frequency of the rotating shaft of the crusher 120, and the ordinate indicates the output torque of the motor 20. In FIG. 10, a solid line corresponds to a continuously outputtable torque characteristic of the motor 20, that is, so-called a torque characteristic at the rating (100%). Besides, in FIG. 10, an alternate long and short dash line corresponds to a maximum instantaneously outputtable torque characteristic including inertia of the rotor of the electrical apparatus that can be output if for a short period of time, which corresponds, for example, to an output of approximately 200% of the rating. In addition, a broken line corresponds to a torque threshold value, which can be set to a value of, for example, approximately 120% to 200% of the rating. Although the torque threshold value can be calculated by the torque threshold value calculation unit 76, a precedently calculated value may be stored in a storage unit 75.

Furthermore, although the torque threshold value exemplified in FIG. 10 is expressed as one curve (line), the torque threshold value is not limited to this. Instead, an upper limit torque threshold value and a lower limit torque threshold value smaller than the upper limit torque threshold value may be calculated, and the rotational frequency of the rotating shaft of the crusher main body 50 can be controlled so that a detected torque can fall between the upper limit torque threshold value and the lower limit torque threshold value.

The torque threshold value calculation unit 76 calculates a torque threshold value (feature amount threshold value) on the basis of the frequency converted by the inverter 40 and a reference threshold value Tc corresponding to the base rotational frequency. The reference threshold value Tc corresponding to the base rotational frequency (base frequency) is a torque threshold value constant in the constant torque region. Assuming that the frequency converted by the inverter 40 is F, a torque threshold value Tf at the frequency F can be calculated in accordance with an expression, Tf=Tc×base frequency/F. Specifically, a torque threshold value at a frequency equal to or greater than the base frequency (of, for example, 50 Hz or 60 Hz) is reduced as the frequency is increased, and a threshold value according to the torque curve of the motor 20 in the constant output region can be obtained. Incidentally, the base frequency is assumed to be 60 Hz in the example illustrated in FIG. 10.

The rotational frequency control unit 74 controls the rotational frequency of the rotating shaft of the crusher main body 50 in accordance with a magnitude relationship between the detected torque (feature amount) and the calculated torque threshold value (feature amount threshold value). Since a threshold value according to the torque curve of the motor 20 can be obtained, even if the rotational frequency of the rotating shaft of the grinder main body 50 is changed in accordance with load variation, a threshold value according to the load variation can be used, and therefore, the electrical apparatus can be operated with an optimum torque output while optimizing the rotational frequency of the rotating shaft of the electrical apparatus.

The torque threshold value can be obtained, apart from the aforementioned calculation method, also as follows.

If, for example, the motor 20 is operated at a frequency equal to or lower than the base rotational frequency, namely, operated in the constant torque region, the torque threshold value calculation unit 76 calculates a torque threshold value on the basis of torques detected by a physical amount detection unit 71 during a prescribed time period. The prescribed time period can be appropriately set to, for example, 1 minute, 2 minutes, 5 minutes or the like. By detecting torques over the prescribed time period, the load variation characteristic can be grasped. The rotational frequency control unit 74 controls the rotational frequency of the rotating shaft of the crusher main body 50 in accordance with a magnitude relationship between the torque detected by the physical amount detection unit 71 and the calculated torque threshold value. Since the torque threshold value can be calculated in accordance with the load variation, the operation can be performed at the optimum rotational frequency and torque with load variation precedently predicted.

More specifically, the torque threshold value calculation unit 76 calculates, as a torque threshold value, the maximum value of torques detected by the physical amount detection unit 71 during a prescribed time period (of, for example, 1 minute, 2 minutes or 5 minutes). For example, a torque value corresponding to a peak value of the torque current can be used as the torque threshold value. In this manner, the operation can be performed at the optimum and maximum rotational frequency in accordance with the load.

Alternatively, the torque threshold value calculation unit 76 can calculate a torque threshold value on the basis of a statistic of torques detected by the physical amount detection unit 71 during a prescribed time period (of, for example, 1 minute, 2 minutes or 5 minutes). The statistic may be a mean or a mean of maximum values. In this manner, the operation can be performed at the optimum and maximum rotational frequency in accordance with the load.

Furthermore, with a torque threshold value of a fixed value (for example, the same threshold value as the torque threshold value of a fixed value in the constant torque region) set in the constant output region of the motor 20, the detected torque may be corrected on the basis of the frequency of the inverter 40 and the torque detected by the physical detection unit 71 in operating the motor 20 in the constant output region, so that the magnitudes of the corrected torque and the torque threshold value of the fixed value can be compared with each other. Assuming, for example, that the frequency of the inverter 40 is F and the detected torque is Tm, a corrected torque Tma can be obtained in accordance with an expression, Tma=Tc×F/base frequency. Here, the base frequency is, for example, 50 Hz or 60 Hz, and Tc is a rated torque obtained in the constant torque region. In other words, when the frequency of the inverter 40 is higher than the base frequency, the detected torque is gradually lowered as compared with the rated torque, and hence, the corrected torque Tma is increased beyond the detected torque to be compared with the torque threshold value of the fixed value.

Figure 11:
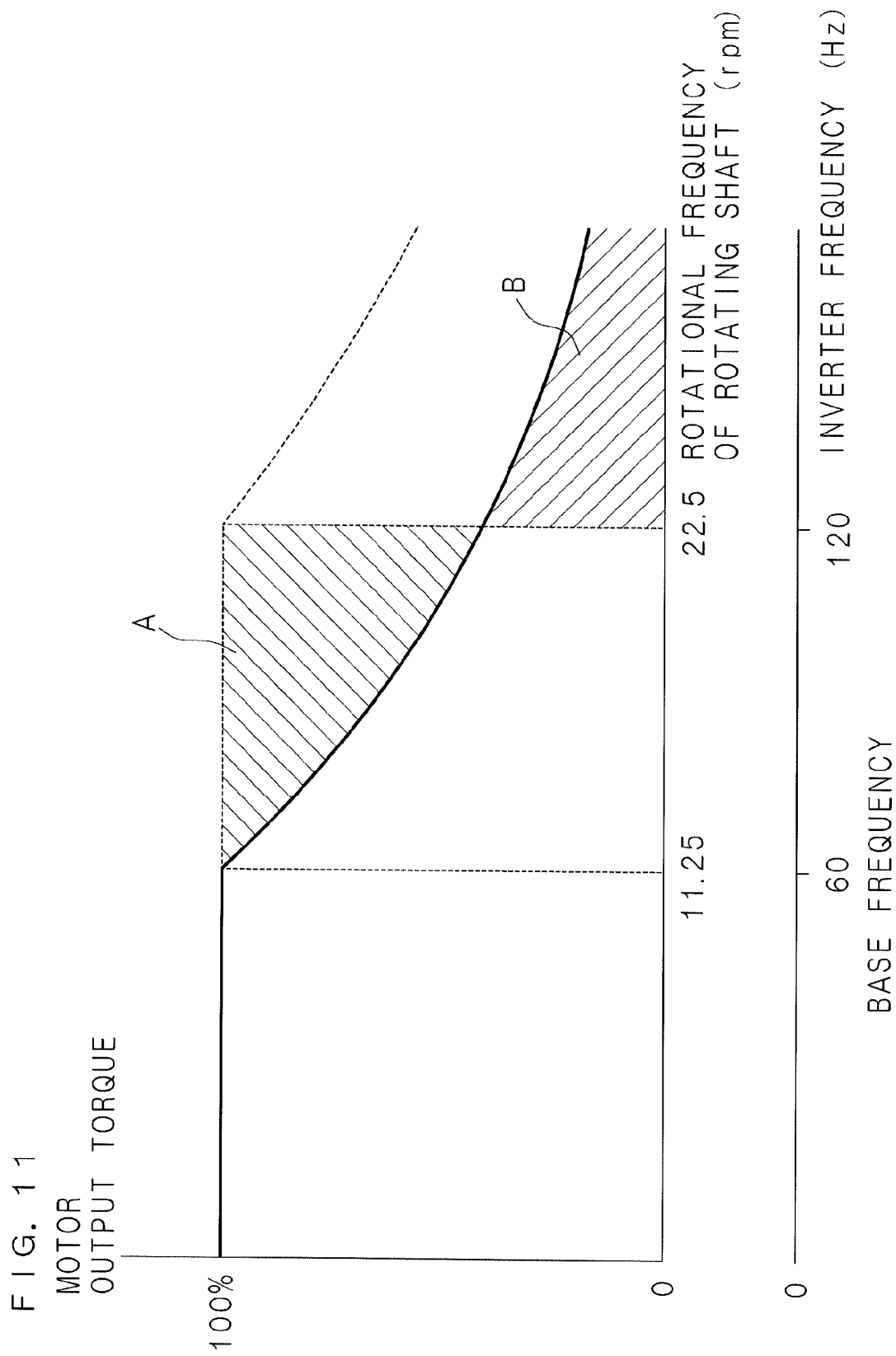
FIG. 11 is an explanatory diagram illustrating an example of the output characteristic of a motor of the crusher of Embodiment 2.

FIG. 11 is an explanatory diagram illustrating an example of the output characteristic of the motor 20 of the crusher 120 of Embodiment 2. In FIG. 11, the abscissa indicates the frequency of the inverter 40 and the rotational frequency of the rotating shaft of the crusher 100, and the ordinate indicates the output torque of the motor 20. In FIG. 11, a solid line corresponds to the output characteristic of the motor 20 of the crusher 120 of Embodiment 2, and a broken line corresponds to the output characteristic of the motor of the conventional crusher exemplarily illustrated in FIG. 6. Incidentally, the output characteristic of the motor 20 exemplarily illustrated in FIG. 11 is equivalent to the output characteristic of the motor 20 illustrated in FIGS. 7 and 8.

As illustrated with a broken line in FIG. 11, the motor of the conventional crusher shows the constant torque characteristic when the rotational frequency of the rotating shaft of the crusher is equal to or lower than 22.5 rpm, and shows the constant output characteristic, with the torque reduced in accordance with the increase of the rotational frequency, when the rotational frequency is equal to or greater than 22.5 rpm. The conventional crusher is operated with the constant torque characteristic so as to always attain the maximum torque in anticipation of load variation, but the crusher is very rarely operated in the vicinity of the maximum torque in a usual operation, and is designed to be always operated with a margin. Therefore, a motor with a large capacity (of, for example, 0.75 kW) is driven at a low load ratio, and a sufficient energy-saving operation cannot be performed.

On the other hand, as illustrated with a solid line in FIG. 11, the motor 20 of the crusher 120 of Embodiment 2 includes a reduction gear 30 with a reduction gear ratio of 1/160, which is higher than the convention reduction gear ratio of 1/80. Therefore, if the motor shaft of the motor 20 is rotated at a base rotational frequency of 1800 rpm with the base frequency of the inverter 40 of 60 Hz, the rotational frequency of the rotating shaft of the crusher 120 is 11.25 rpm. In other words, the motor 20 of the crusher 120 of Embodiment 2 shows the constant torque characteristic and can output the torque equivalent to that of the conventional crusher when the rotational frequency of the rotating shaft of the crusher 120 is equal to or lower than 11.25 rpm, and shows the constant output characteristic, with the torque lowered as the rotational frequency is increased, when the rotational frequency is equal to or higher than 11.25 rpm. Besides, the capacity (rating) of the motor 20 of Embodiment 2 is 0.4 kW, which is smaller than the capacity of the motor used in the conventional crusher.

In the case where a large torque is necessary because the load is high as in a region A of FIG. 11, namely, in the case where the torque detected by the physical amount detection unit 71 is larger than the torque threshold value, the rotational frequency control unit 74 lowers the rotational frequency of the rotating shaft of the crusher main body 50 by lowering the frequency of the inverter 40. If the detected torque exceeds the torque threshold value due to, for example, load variation, the torque is increased by lowering the rotational frequency of the rotating shaft. In this manner, even if the load is high, a necessary torque can be obtained, so as to increase the grinding capacity in accordance with the load variation.

Alternatively, in the case where a large torque is not necessary because the load is low as in a region B of FIG. 11, namely, in the case where the torque detected by the physical amount detection unit 71 is smaller than the torque threshold value, the rotational frequency control unit 74 increases the rotational frequency of the rotating shaft of the crusher main body 50 by increasing the frequency of the inverter 40. If the detected torque is lower than the torque threshold value due to, for example, load variation, the torque is lowered by increasing the rotational frequency of the rotating shaft. In this manner, even when the load becomes low, the rotational frequency can be increased while retaining a necessary torque, so as to increase the grinding capacity in accordance with the load variation. Besides, in the present embodiment, a frequency-variable general inverter can be used as the inverter 40.

If the torque detected by the physical amount detection unit 71 is larger than the torque threshold value, the rotational frequency control unit 74 lowers the rotational frequency at a prescribed reduction gradient until the detected torque becomes equal to or lower than the torque threshold value. The prescribed reduction gradient can be set as a gradient of, for example, the rotational frequency of the rotating shaft obtained when the frequency of the inverter is lowered by 5 Hz per second. Incidentally, the rotational frequency can be continuously changed over time, or changed in a discrete manner (in a stepwise manner). Thus, the rotational frequency of the rotating shaft can be lowered not abruptly but gradually. It is noted that the reduction gradient is not limited to that of 5 Hz mentioned above.

If the torque detected by the physical amount detection unit 71 is smaller than the torque threshold value for a prescribed period of time, the rotational frequency control unit 74 increases the rotational frequency at a prescribed increase gradient. The prescribed period of time can be precedently set to, for example, 10 minutes, 5 minutes or the like. The prescribed increase gradient can be set as, for example, a gradient of the rotational frequency of the rotating shaft obtained when the frequency of the inverter is increased by 5 Hz per second. Incidentally, the rotational frequency can be continuously changed over time, or changed in a discrete manner (in a stepwise manner). Thus, the rotational frequency of the rotating shaft can be increased not abruptly but gradually. It is noted that the increase gradient is not limited to that of 5 Hz mentioned above.

As illustrated with the broken line in FIG. 11, in the conventional crusher, the reduction gear ratio of the reduction gear is set to, for example, approximately 1/80, so that the constant torque characteristic can be obtained up to the rotational frequency of the rotating shaft of the crusher of approximately 22.5 rpm when the base rotational frequency of the motor is 1800 rpm (when the base frequency of the inverter is 60 Hz). Besides, the constant torque characteristic can be obtained up to the rotational frequency of the rotating shaft of the crusher of approximately 18.75 rpm when the base rotational frequency of the motor is 1500 rpm (when the base frequency of the inverter is 50 Hz).

In Embodiment 2, the degree of the reduction gear ratio of the reduction gear 30 is larger (to be, for example, 1/160 or the like) than that of the conventional one, so that the rotational frequency of the rotating shaft of the crusher 120 can be equal to or lower than 18 rpm when the motor 20 is operated at a rotational frequency of the base rotational frequency. Incidentally, in the example illustrated in FIG. 11, if the base frequency of the inverter 40 is 60 Hz, the rotational frequency of the rotating shaft of the crusher 120 obtained at the base rotational frequency of the motor 20 is 11.25 rpm, and if the base frequency of the inverter 40 is 50 Hz, the rotational frequency of the rotating shaft of the crusher 120 obtained at the base rotational frequency of the motor 20 is 9.375 rpm, and thus, the rotational frequency is equal to or lower than 18 rpm in both cases.

Thus, the range of the constant torque region of the motor 20 can be narrowed and the range of the constant output region can be increased as compared with the conventional ones, and hence the rotational frequency and the torque can be adjusted over larger ranges in accordance with load variation, so that larger load variation can be coped with. Incidentally, the rotational frequency of the rotating shaft of the crusher 120 obtained at the base rotational frequency of the motor 20 is not limited to 11.25 rpm exemplarily illustrated in FIG. 11, but the constant output characteristic can be applied over a larger range of the rotational frequency of the rotating shaft than in the conventional one as long as the rotational frequency is equal to or lower than 18 rpm.

In the case where the motor 20 is operated at a rotational frequency equal to or lower than the base rotational frequency, namely, in the case where the motor 20 is operated in the constant torque range, if the torque detected by the physical amount detection unit 71 is larger than the torque threshold value, the rotational frequency control unit 74 stops the motor 20 without controlling the rotational frequency. Since the torque value falling in the constant torque range is larger than the torque threshold value in the constant output range, if a torque exceeding such a large torque threshold value is caused, it is determined that an unexpected metal piece or the like has entered the rotor or the like, and the motor 20 is stopped. In this manner, the electrical apparatus can be prevented from being damaged, and thus, the electrical apparatus can be protected.

Figure 12:
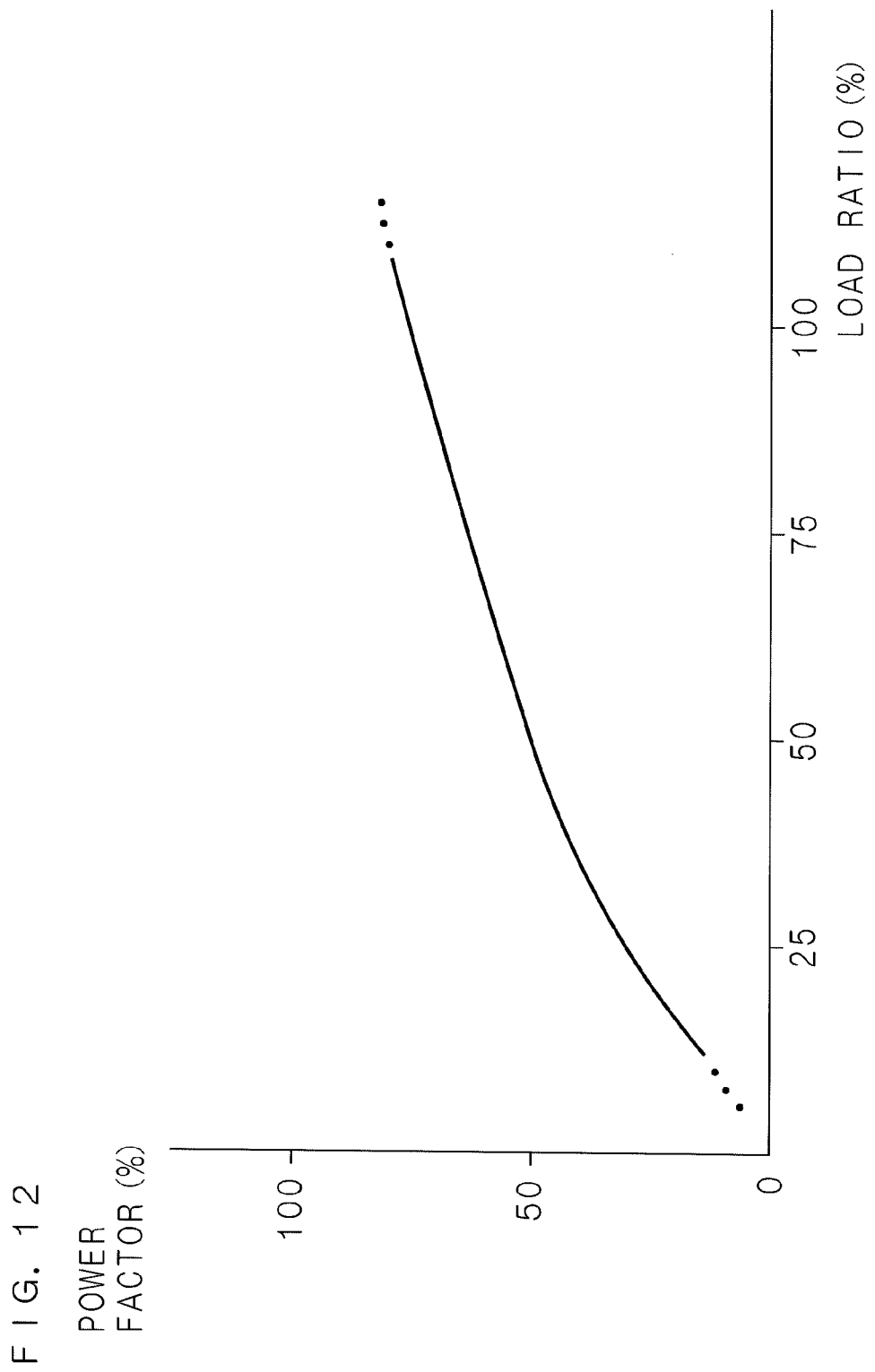
FIG. 12 is an explanatory diagram illustrating a relationship between a load ratio and a power factor of an electric motor.

FIG. 12 is an explanatory diagram illustrating a relationship between a load ratio and a power factor of an electric motor. A conventional motor and the motor 20 of Embodiment 2 have similar characteristics to that of the general electric motor illustrated in FIG. 12. Specifically, as the load ratio is lower, the power factor is lower so as to reduce efficiency. As exemplarily illustrated in FIGS. 6 and 11, the conventional motor cannot perform a sufficiently energy-saving operation because a motor with a large capacity (of, for example, 0.75 kW) is driven at a low load ratio for coping with load variation, and hence the power factor is lowered and the efficiency is lowered. Since the motor 20 of Embodiment 2 has a small capacity (of, for example, 0.4 kW), the load ratio can be increased and the power factor can be increased, and therefore, the energy can be saved even when the crusher 120 is operated with the constant torque characteristic of the motor 20.

FIG. 13 is an explanatory diagram illustrating an example of the characteristic obtained in an operation of the crusher 120 of Embodiment 2. FIG. 13 also illustrates, as a comparative example, the characteristic of the conventional crusher for comparison. As for both the present embodiment and the comparative example, the operation is performed under the same load state (where the same processing object in the same amount is crushed). In the present embodiment, the frequency of the inverter 40 is 120 Hz, the rating of the motor 20 is 0.4 kW, the reduction gear ratio of the reduction gear 30 is 1/160, the power factor is 0.43 and the power consumption is 98.3 W. On the contrary, in the comparative example, the frequency of the inverter is 60 Hz, the rating of the motor is 0.75 kW, the reduction gear ratio of the reduction gear is 1/80, the power factor is 0.23, and the power consumption is 155.2 W. It is thus understood that the energy can be saved by 36.7% in the present embodiment as compared with that in the conventional example.

As the feature amount pertaining to the torque, a torque current Ir of the motor 20, a load current I of the motor 20, or the like can be detected instead of the configuration where the torque of the motor 20 is detected. Specifically, the physical amount detection unit 71 may detect the torque current Ir of the motor 20, or may detect the load current of the motor 20, and in either case, the feature amount is detected instead of the torque of the motor 20.

Assuming that a phase angle between an input voltage and an input current of the motor 20 is 0, there is a relationship of a torque current Ir=a load current I×cos θ. Here, cos θ is the power factor. As the power factor cos θ, a value of, for example, approximately 20% to 80% can be used in accordance with the load state.

Furthermore, a torque Tm and a torque current Ir can be in a relationship of, for example, Tm=k×Pw/Vf and Pw=V×Ir×η. Here, k is a constant determined by the motor 20, Pw is an output power, Vr is a rotational frequency of the motor 20, V is an input voltage and η is efficiency. In other words, a torque of the motor 20 can be obtained by detecting the torque current Ir of the motor 20 or the load current I of the motor 20.

Embodiment 3

Figure 14:
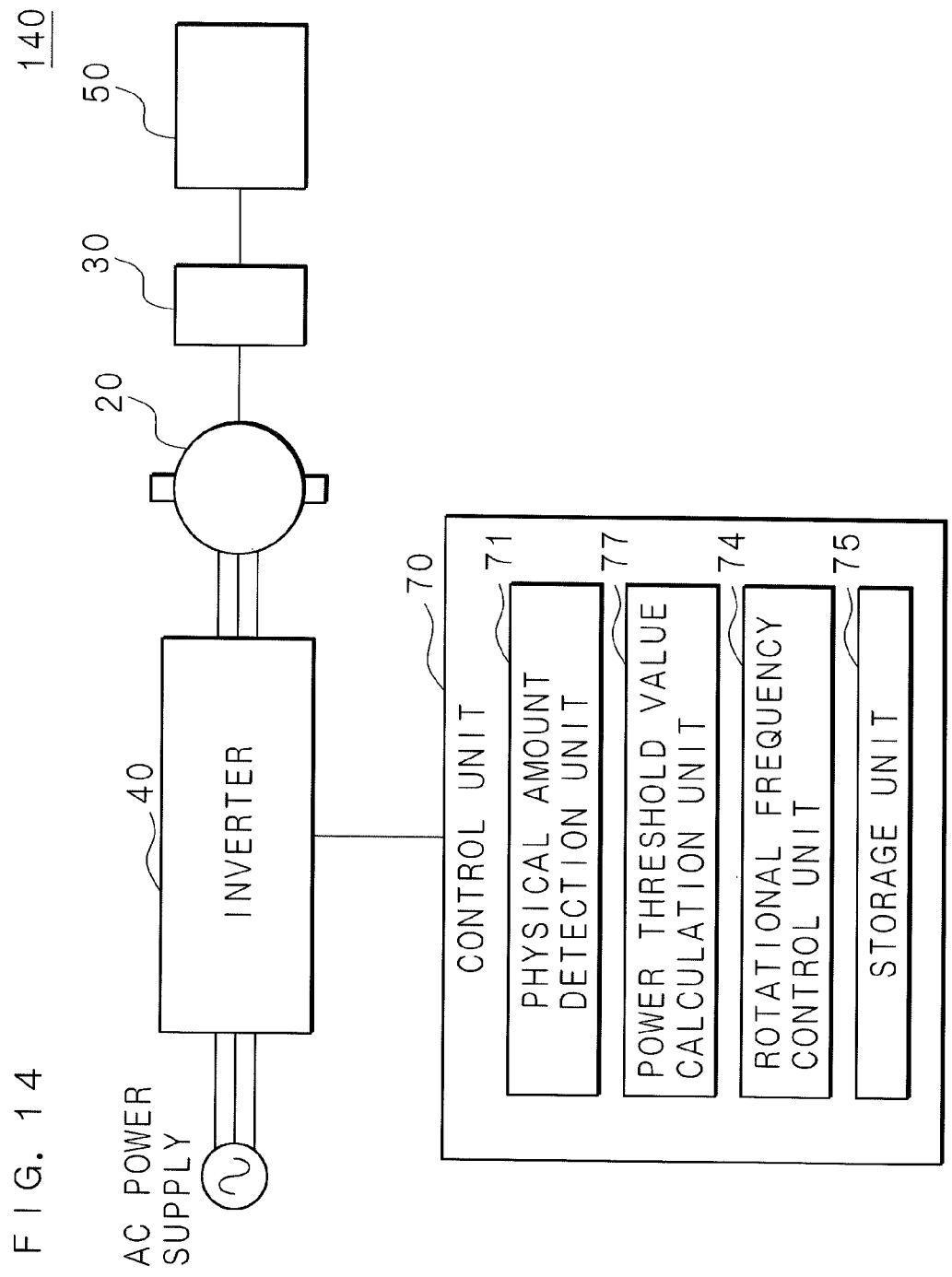
FIG. 14 is a block diagram of an example of a circuit configuration of a crusher according to Embodiment 3.

FIG. 14 is a block diagram of an example of a circuit configuration of a crusher 140 according to Embodiment 3. Differently from the crusher 100 of Embodiment 1, the crusher of this embodiment includes a power threshold value calculation unit 77 instead of the rotational frequency determination unit 72 and the threshold value selection unit 73. While a threshold value is selected in the configuration of Embodiment 1, a power threshold value (an output power threshold value) of a motor 20 is calculated in the configuration of Embodiment 3.

A physical amount detection unit 71 detects an output power (output) of the motor 20.

If the motor 20 is operated at a rotational frequency equal to or lower than the base rotational frequency, a rotational frequency control unit 74 controls the rotational frequency of a rotating shaft of a crusher main body 50 in accordance with a magnitude relationship between the detected output power and a power threshold value.

The output characteristic of the motor 20 controlled by an inverter 40 shows a constant torque characteristic at a rotational frequency equal to or lower than the base rotational frequency, and shows a constant output characteristic (constant output power characteristic) at a rotational frequency equal to or greater than the base rotational frequency. If the motor 20 is operated at a rotational frequency equal to or lower than the base rotational frequency, namely, operated in a constant torque region, the rotational frequency control unit 74 controls the rotational frequency of the rotating shaft in accordance with a magnitude relationship between the detected output power and the power threshold value. A torque Tm of the motor 20 is expressed as Tm=a×Pw/Vf. Here, a is a coefficient determined by the structure of the motor 20, Pw is an output power of the motor 20, and Vf is a rotational frequency of the motor shaft of the motor 20. If the torque of the motor 20 operated in the constant torque region is varied in accordance with a load state, the output power of the motor 20 is varied assuming that the rotational frequency of the motor 20 is not changed.

Therefore, for example, if the detected output power is smaller than the power threshold value, the load is low, and hence the rotational frequency of the crusher main body 50 is increased for increasing the grinding capacity. Alternatively, if the detected output power is larger than the power threshold value, the load is high, and hence, the torque is increased by lowering the rotational frequency of the rotating shaft of the crusher main body 50 for preventing the overload stop. In this manner, a torque in accordance with the load characteristic can be obtained, and the maximum grinding capacity can be attained with the optimum rotational frequency. Therefore, there is no need to precedently provide an electric motor with a large capacity (a large rated value), and there is no need to operate an electric motor with a large capacity at a low load ratio, and hence, an inexpensive electric motor with a small capacity can be used and the energy can be saved. Besides, the rotational frequency of the electrical apparatus can be controlled in accordance with the load characteristic.

Figure 15:
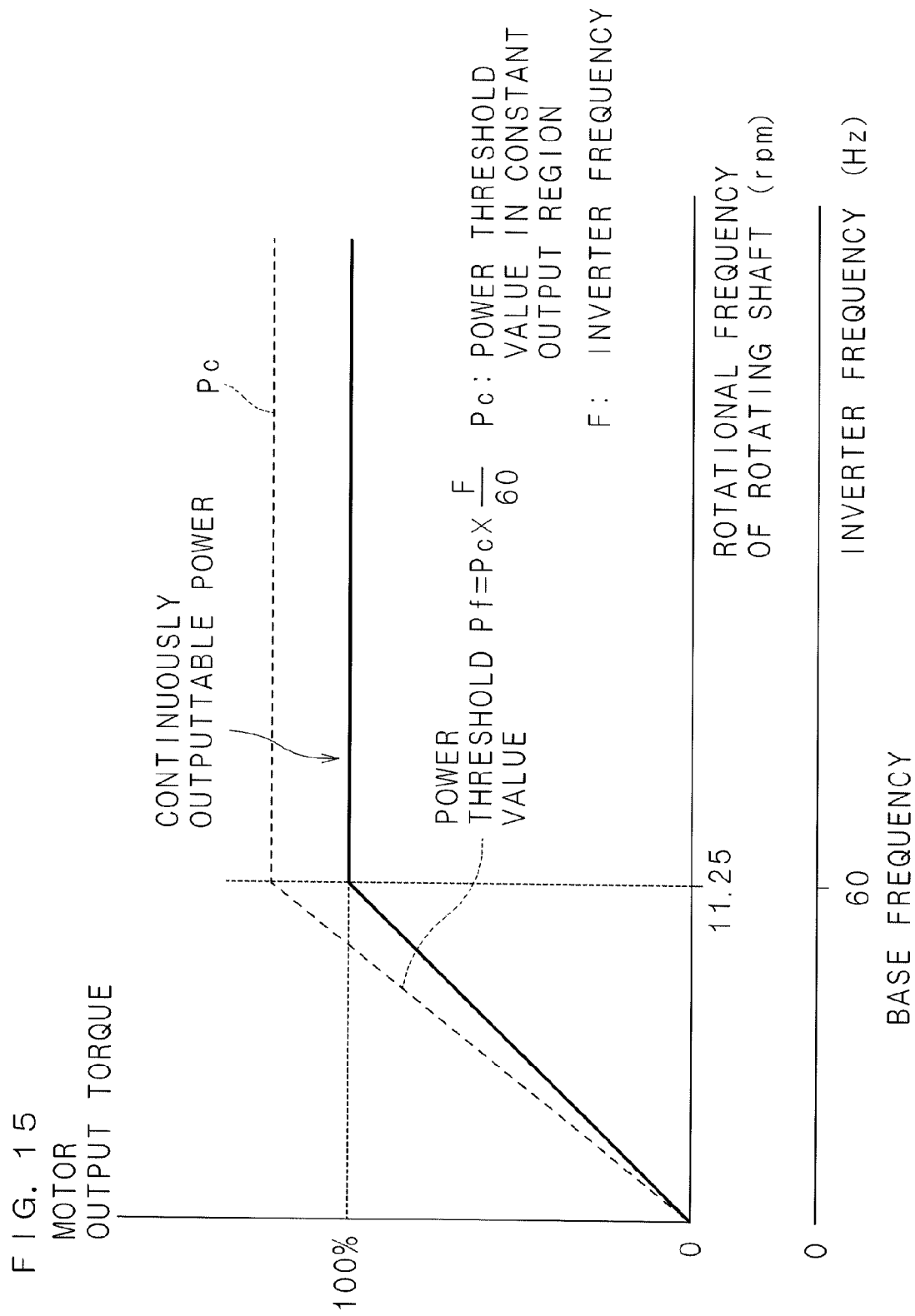
FIG. 15 is an explanatory diagram illustrating an example of a power threshold value of the crusher of Embodiment 3.

FIG. 15 is an explanatory diagram of an example of the power threshold value of the crusher 140 of Embodiment 3. In FIG. 15, the abscissa indicates the rotational frequency of the rotating shaft of the crusher 140, and the ordinate indicates the output power of the motor 20. In FIG. 15, a solid line corresponds to a continuously outputtable power characteristic of the motor 20, that is, so-called an output power characteristic at the rating (100%). Besides, a broken line corresponds to a power threshold value, which can be set to, for example, a value of approximately 120% to 200% of the rating. Although the power threshold value can be calculated by the power threshold value calculation unit 77, a precedently calculated value may be stored in a storage unit 75.

Furthermore, although the power threshold value exemplarily illustrated in FIG. 11 is expressed as one curve (line), the power threshold value is not limited to this. Instead, an upper limit power threshold value and a lower limit power threshold value smaller than the upper limit power threshold value may be calculated, and the rotational frequency of the rotating shaft of the crusher main body 50 may be controlled so that a detected output power can fall between the upper limit power threshold value and the lower limit power threshold value.

The power threshold value calculation unit calculates a power threshold value on the basis of a frequency converted by the inverter 40 and a reference threshold value Pc corresponding to the base rotational frequency. The reference threshold value Pc corresponding to the base rotational frequency (base frequency) is a power threshold value constant in the constant output region. Assuming that the frequency converted by the inverter 40 is F, the power threshold value Pf at the frequency F can be calculated in accordance with an expression, Pf=Pc×F/base frequency. Specifically, the power threshold value at a frequency equal to or lower than the base frequency (of, for example, 50 Hz or 60 Hz) is increased as the frequency is increased, and a threshold value according to the output power curve of the motor 20 in the constant torque region can be obtained. Incidentally, in the example illustrated in FIG. 15, the base frequency is assumed to be 60 Hz.

The rotational frequency control unit 74 controls the rotational frequency of the rotating shaft of the crusher main body 50 in accordance with a magnitude relationship between the detected output power and the calculated power threshold value. Since the threshold value according to the output power curve of the motor 20 can be obtained, even if the rotational frequency of the rotating shaft of the crusher main body 50 is changed due to load variation, a threshold value according to the load variation can be used, and hence, the electrical apparatus can be operated with the optimum torque output while optimizing the rotational frequency of the rotating shaft of the electrical apparatus.

In the case where the motor 20 is operated at a rotational frequency equal to or lower than the base rotational frequency, namely, in the case where the motor 20 is operated in the constant torque region, if the detected output power is larger than the power threshold value, the rotational frequency control unit 74 lowers the rotational frequency of the rotating shaft of the crusher main body 50. For example, if the detected output power exceeds the power threshold value due to load variation, the torque is increased by lowering the rotational frequency of the rotating shaft of the crusher main body 50. In this manner, even if the load becomes high, a necessary torque can be obtained, so as to prevent the overload stop in accordance with the load variation.

In the case where the motor 20 is operated at a rotational frequency equal to or lower than the base rotational frequency, namely, in the case where the motor 20 is operated in the constant torque region, if the detected output power is smaller than the power threshold value, the rotational frequency control unit 74 increases the rotational frequency of the rotating shaft of the crusher main body 50. For example, if the detected output power is smaller than the power threshold value due to load variation, the torque is reduced by increasing the rotational frequency of the rotating shaft of the crusher main body 50. In this manner, even if the load becomes low, the rotational frequency can be increased while retaining a necessary torque, so as to increase the grinding capacity in accordance with the load variation.

Incidentally, with a power threshold value of a fixed value (for example, the same threshold value as a power threshold value of a fixed value in the constant output region) set in the constant torque region of the motor 20, a detected output power can be corrected on the basis of a frequency of the inverter 40 obtained in operating the motor 20 in the constant torque region and an output power detected by the physical amount detection unit 71, and the magnitudes of the corrected output power and the power threshold value of the fixed value can be compared with each other. For example, assuming that the frequency of the inverter 40 is F and the detected output power is Pw, a corrected output power Pwa can be obtained in accordance with an expression, Pwa=Pwc×F/base frequency. Here, the base frequency is, for example, 50 Hz or 60 Hz, and Pwc is a rated output power in the constant output region. Specifically, in the constant torque region, as the frequency of the inverter 40 is increased, the detected output power is gradually increased to the rated output power. Therefore, the corrected output power Pwa is increased beyond the detected output power, so as to be compared with the power threshold value of the fixed value.

Embodiment 4

Figure 16:
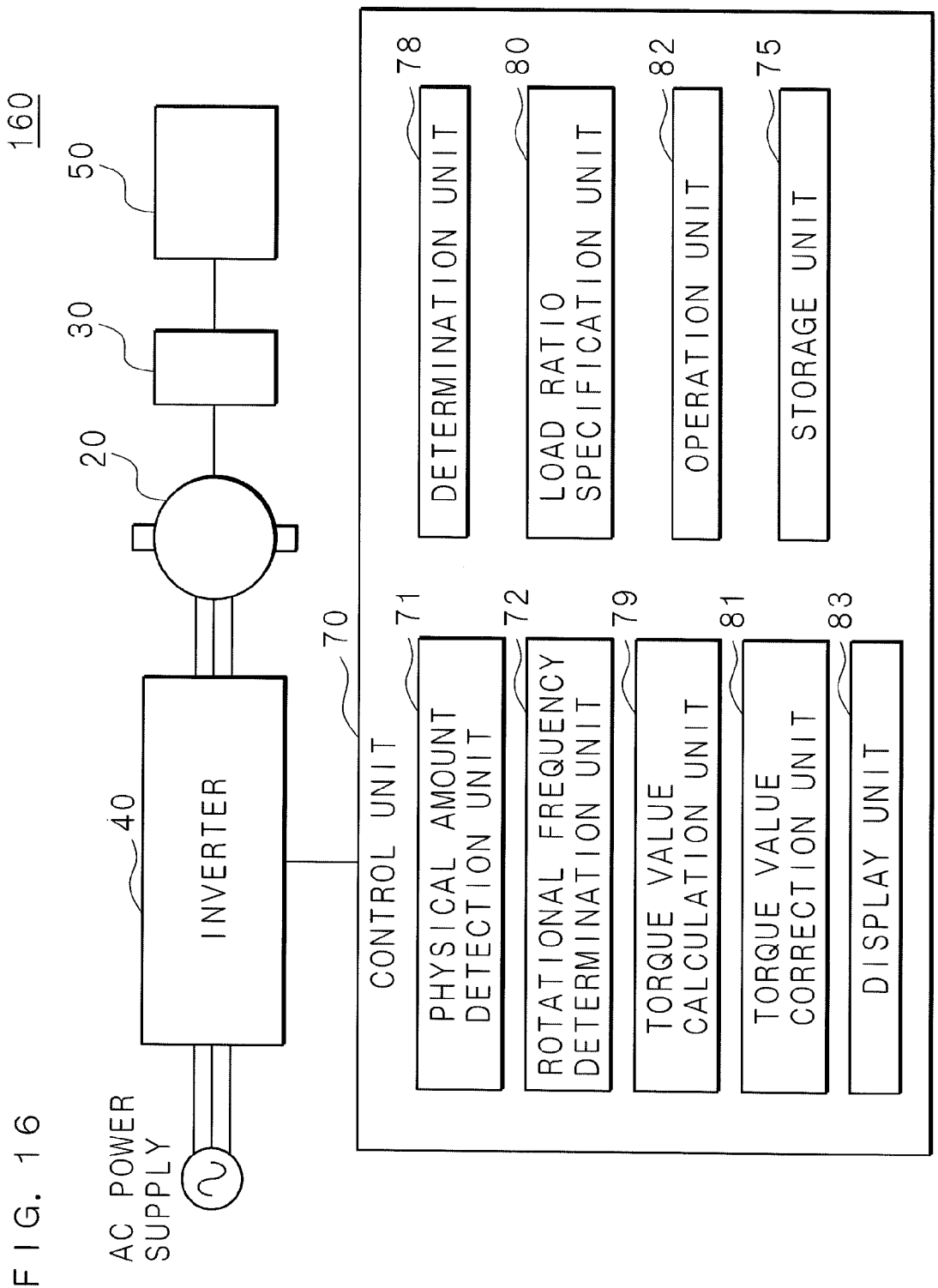
FIG. 16 is a block diagram of an example of a circuit configuration of a crusher according to Embodiment 4.

FIG. 16 is a block diagram of an example of a circuit configuration of a crusher 160 according to Embodiment 4. Differently from the crushers of Embodiments 1 to 3, the crusher of this embodiment includes a determination unit 78, a torque value calculation unit 79, a load ratio specification unit 80, a torque value correction unit 81, an operation unit 82, a display unit 83 and the like.

The determination unit 78 causes an inverter 40 to convert a frequency (that is, for example, a rated frequency and may be a commercial frequency) of an AC power supply to a low frequency region lower than the original frequency, and determines, by actually crushing a grinding object, whether or not the grinding object can be crushed within an allowable torque range of a motor 20. As an allowable torque, for example, any torque equal to or lower than a desired torque threshold value falling in a range from a continuously outputtable torque of the motor 20 to a maximum instantaneously outputtable torque that can be output for a short period of time can be regarded to fall in the allowable torque range.

The rated frequency of the inverter 40 is, for example, 50 Hz or 60 Hz, and the low frequency region is, for example, a frequency ranging from several Hz to approximately 20 Hz. The low frequency region is preferably approximately 10% of the rated frequency and can be set to a range of 5 Hz or 6 Hz±several Hz. Now, a method for determining whether or not a grinding object can be crushed will be specifically described.

Figure 17:
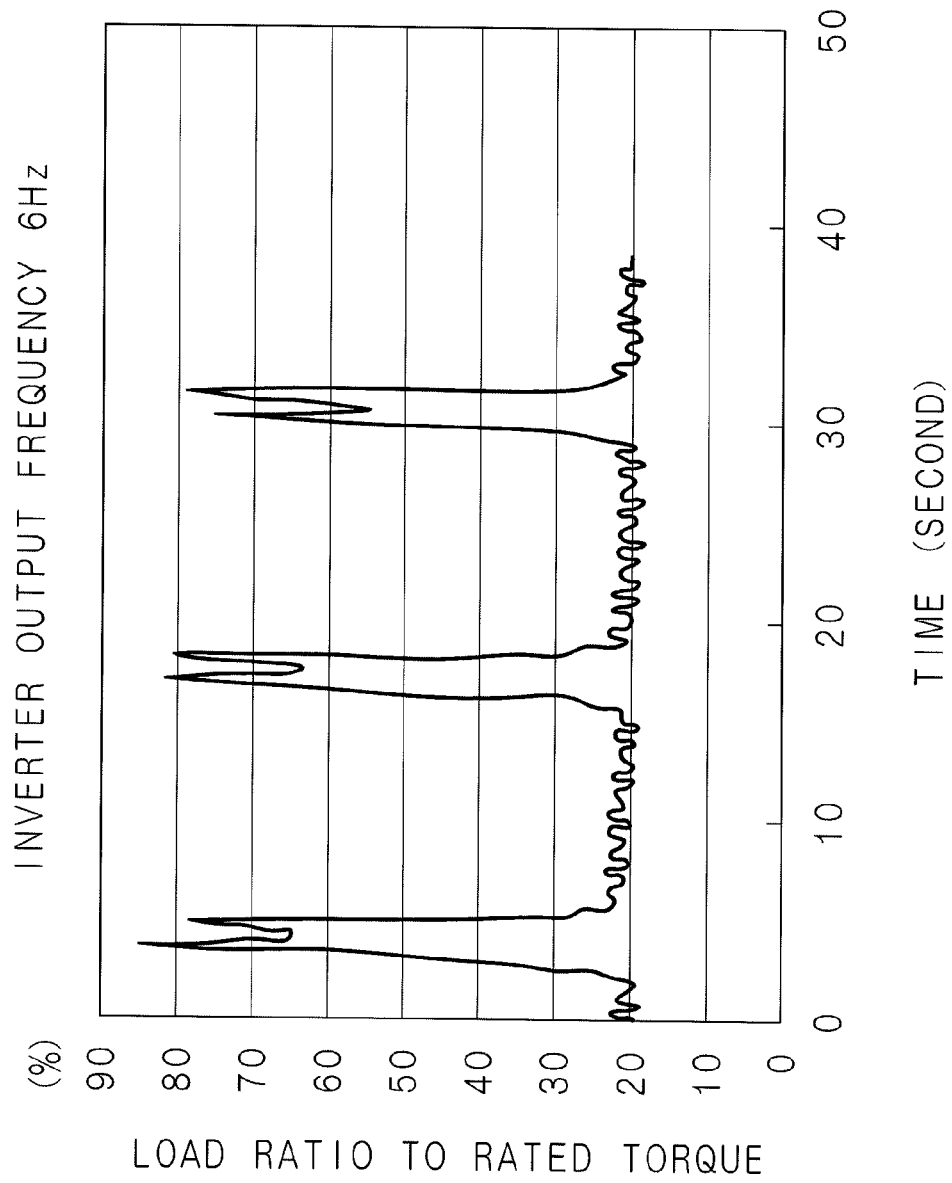
FIG. 17 is an explanatory diagram of exemplified actually measured values of a load ratio to a rated torque obtained when the output frequency of an inverter is 6 Hz.
Figure 18:
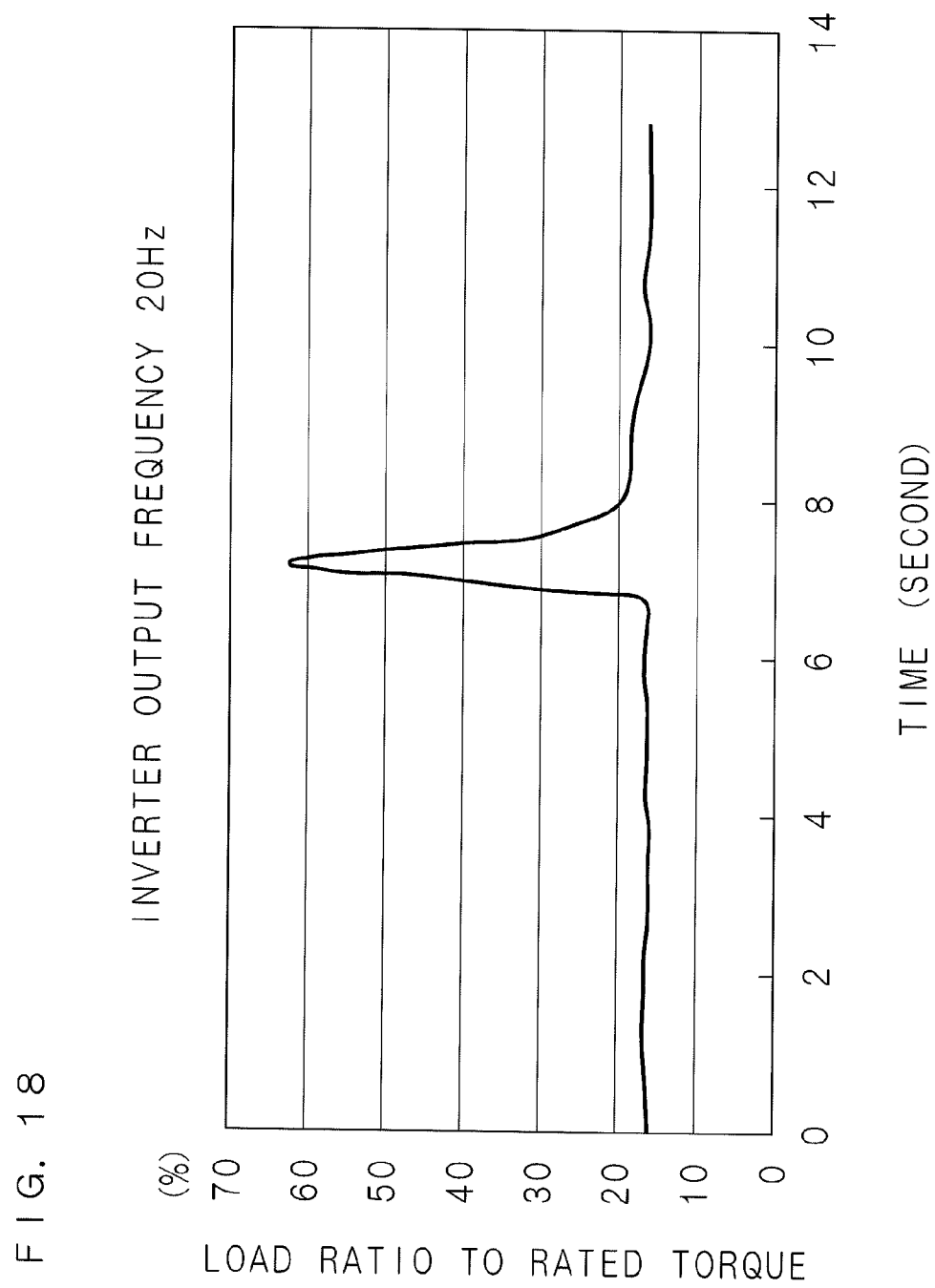
FIG. 18 is an explanatory diagram of exemplified actually measured values of the load ratio to the rated torque obtained when the output frequency of the inverter is 20 Hz.
Figure 19:
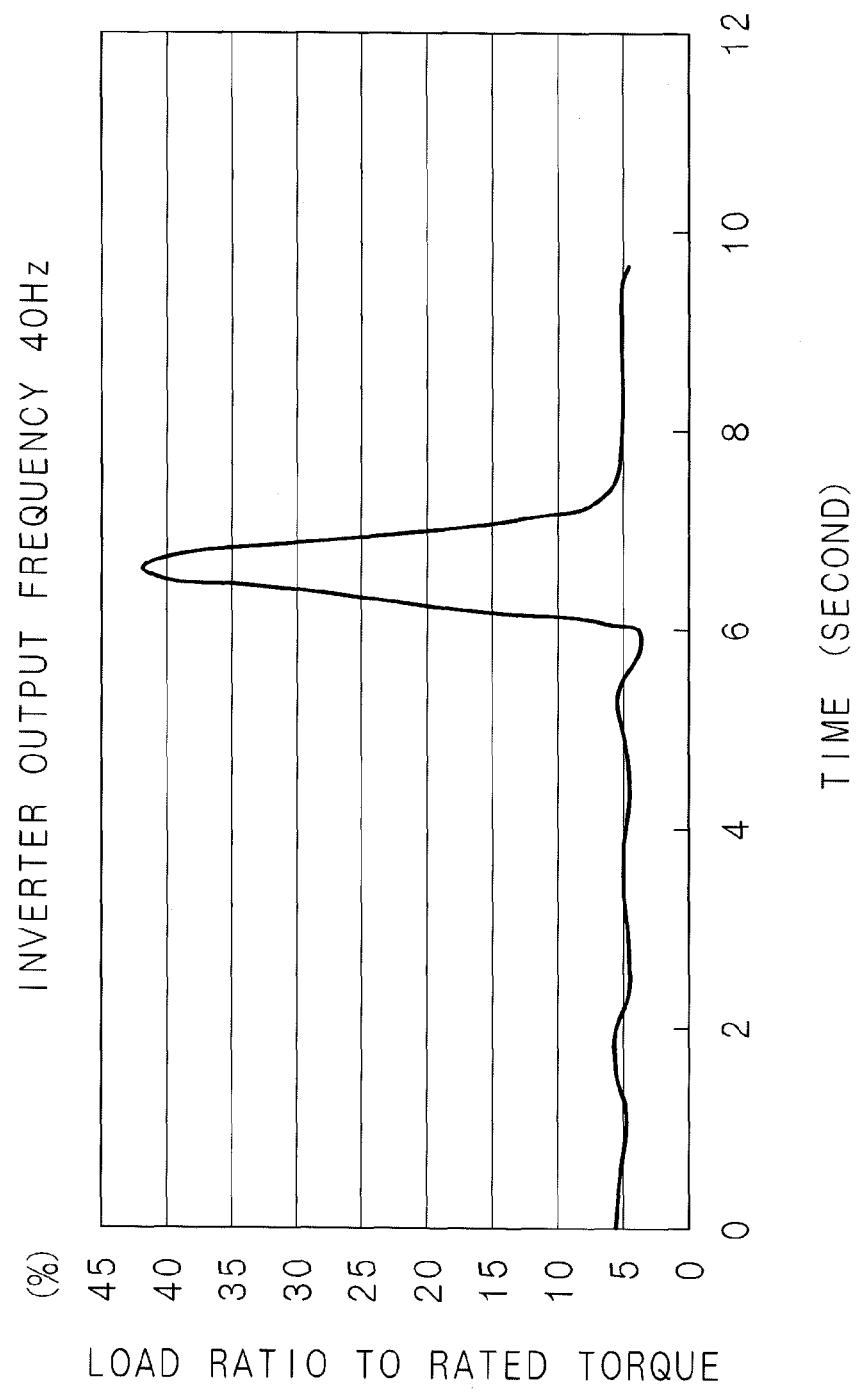
FIG. 19 is an explanatory diagram of exemplified actually measured values of the load ratio to the rated torque obtained when the output frequency of the inverter is 40 Hz.
Figure 20:
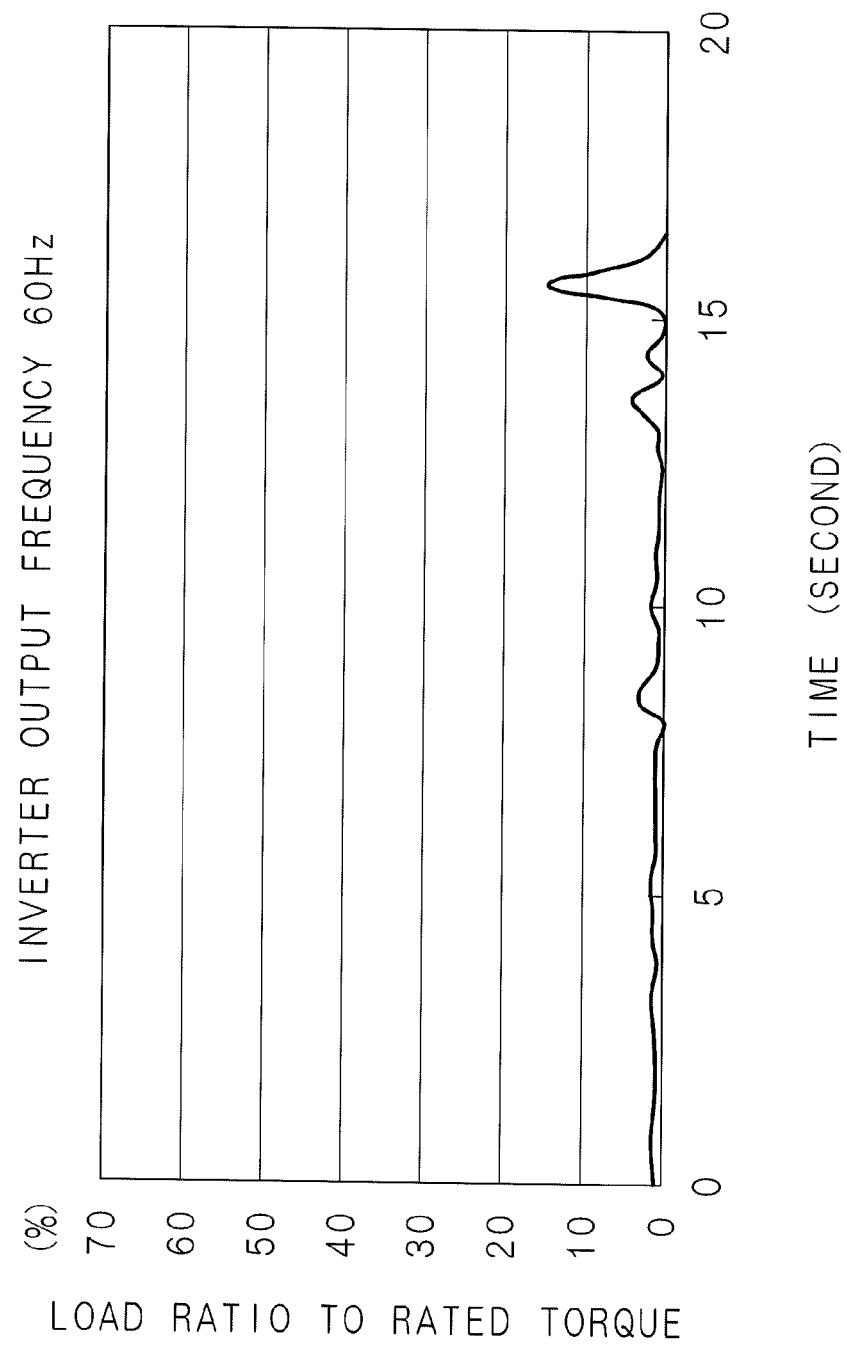
FIG. 20 is an explanatory diagram of exemplified actually measured values of the load ratio to the rated torque obtained when the output frequency of the inverter is 60 Hz.

FIG. 17 is an explanatory diagram of exemplified actually measured values of a load ratio to a rated torque when the output frequency of the inverter 40 is 6 Hz, FIG. 18 is an explanatory diagram of exemplified actually measured values of the load ratio to the rated torque when the output frequency of the inverter 40 is 20 Hz, FIG. 19 is an explanatory diagram of exemplified actually measured values of the load ratio to the rated torque when the output frequency of the inverter 40 is 40 Hz, and FIG. 20 is an explanatory diagram of exemplified actually measured values of the load ratio to the rated torque when the output frequency of the inverter 40 is 60 Hz.

In FIGS. 17 to 20, the abscissa indicates a grinding time for the grinding object (such as polypropylene in the shape of a plate piece with a thickness of 3 mm), and the ordinate indicates the load ratio to the rated torque of the motor 20. The load ratio to the rated torque means a ratio of a torque Tm to an actual torque T (that is, a torque actually applied to the load). Incidentally, the same grinding object is used in FIGS. 17 to 20. As illustrated in FIGS. 17 to 20, as the output frequency of the inverter 40 is increased (higher), the load ratio is smaller.

Figure 21:
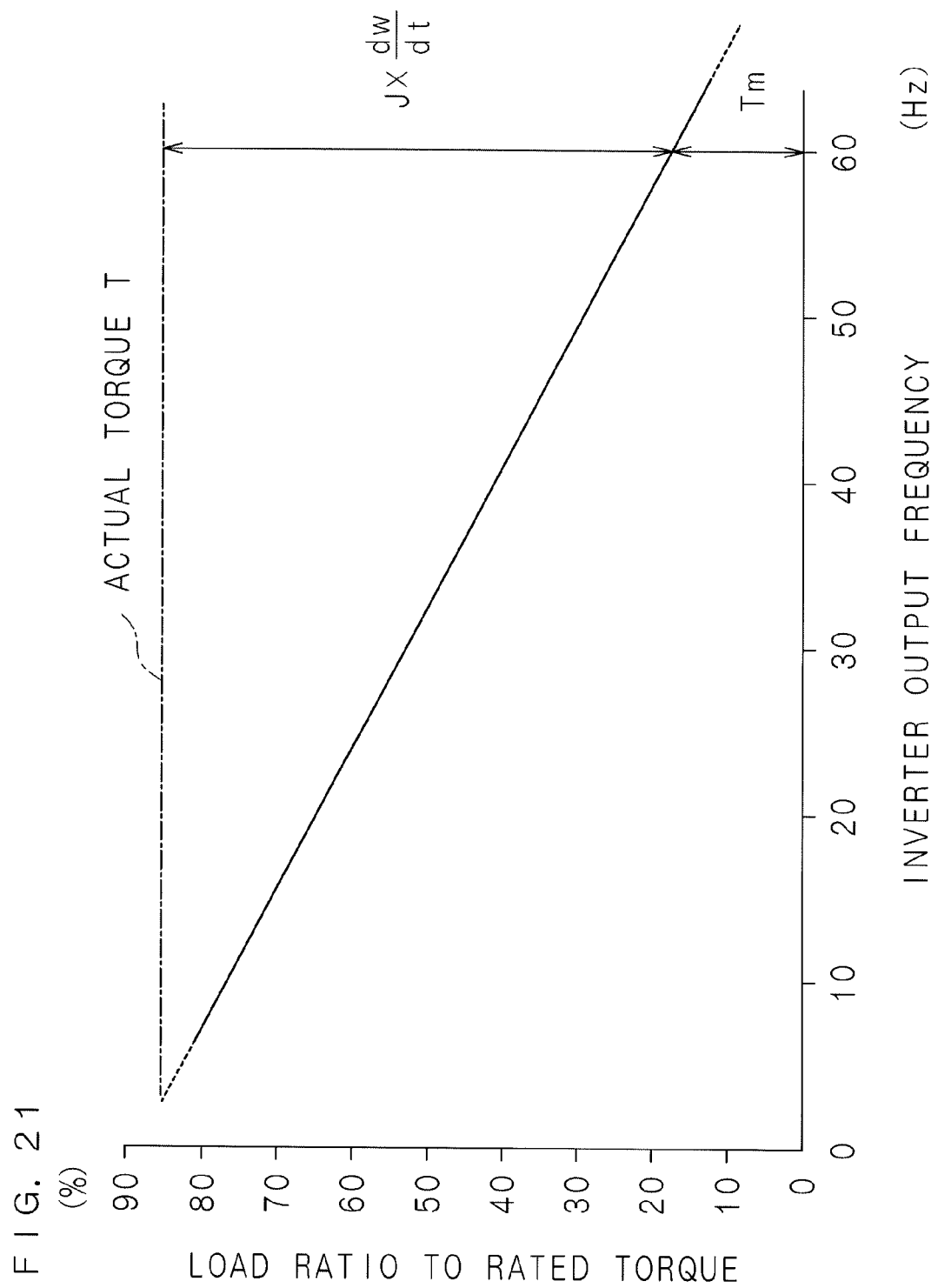
FIG. 21 is an explanatory diagram illustrating an example of a correspondence relationship between the output frequency of an inverter and a load ratio.

FIG. 21 is an explanatory diagram illustrating an example of a correspondence relationship between the output frequency of the inverter 40 and the load ratio. In FIG. 21, the abscissa indicates the output frequency of the inverter 40, and the ordinate indicates the load ratio to the rated torque of the motor 20. FIG. 21 is obtained by plotting mean values of the actually measured values of FIGS. 17 to 20.

As is understood from FIG. 21, even when the same load is applied, as the output frequency of the inverter 40 is increased (higher), namely, as the speed of cutting the grinding object is increased, an additional inertia torque component derived from the inertia of the rotating shaft and the like, J×dw/dt (a torque output through the inertia by the motor 20), is increased, and a ratio of the torque Tm of the motor 20 occupying in the actual torque T is reduced. In other words, the load ratio to the rated torque of the motor 20 is reduced. The actual torque T can be expressed as $T=(J \times dw/dt)+Tm$. Here, J is a moment of inertia of the rotating shaft and the like, and w is an angular velocity of the rotating shaft. Accordingly, (dw/dt) is an angular acceleration of the rotating shaft or the like.

Specifically, there is a correspondence relationship as illustrated in FIG. 21 between the load ratio L to the rated torque (actual torque) of the motor 20 and the output frequency F of the inverter 40. The correspondence relationship of FIG. 21 can be approximated by, for example, $L=87-1.2\times F$. It is noted that the correspondence relationship illustrated in FIG. 21 is merely an example, and the relationship is varied depending upon the shape or the material of the grinding object. If the grinding object is, for example, a hard material, a line (or curve) of the correspondence relationship is inclined at a larger angle and the load ratio in a low frequency region is increased as compared with the case where it is a soft material.

In FIG. 21, in the case where the output frequency of the inverter 40 is 60 Hz, if the load ratio L can be approximated as 20%, it means that a ratio of the torque Tm detected by a physical amount detection unit 71 occupying in the actual torque T is 20%, and it is understood that the actual torque T actually applied by the motor 20 to the load is 4 times as large as the torque Tm. The additional inertia torque does not appear on the drive current of the motor 20, and therefore, in the conventional crusher, this actual torque T cannot be detected and the torque Tm is regarded as the torque applied to the load.

Specifically, when a grinding object is crushed by operating the inverter 40 with its output frequency set to a rated frequency (of 50 Hz or 60 Hz), transient overload is caused and a high load is applied to the rotary blade (rotating shaft). Since the inertia of the motor shaft of the motor 20 rotating at a higher speed than the rotating shaft of the crusher main body 50 is large, if the overload is applied to the rotating shaft of the crusher main body 50, an inertia-added torque (a multiplied value of a moment of inertia and an angular acceleration) much greater than the torque of the motor 20 (torque caused by the drive current of the motor) is caused due to the large inertia of the motor shaft rotating at a high speed, and the actual torque (torque actually applied to the load) is a sum of the torque of the motor 20 and the inertia-added torque. Specifically, if the inverter 40 is operated, for example, at the rated frequency, the actual torque is not the torque of the motor 20 but a torque greater than this torque, that is, a sum of this torque and the inertia-added torque. Therefore, if it is determined, as in the conventional crusher, whether or not a grinding object can be crushed depending upon whether or not the torque falls in an allowable range, since an unexpectedly large torque is actually applied to the load, it is apprehended that the actual torque may exceed the allowable range.

On the other hand, the torque (actual torque) T applied to the load, namely, a force to cut a grinding object, is constant regardless of the magnitude of the rotational frequency of the rotating shaft (rotary blade) (the output frequency of the inverter 40). Therefore, the inverter 40 is operated in a state where the output frequency falls in the low frequency region, so as to reduce (lower) the rotational frequency of the motor shaft, and thus, the influence of the inertia-added torque is minimized, so as to crush the grinding object in a state where the torque is close to the actual torque T. By determining whether or not the torque Tm falls in the allowable range in this case, it can be approximately determined whether or not the actual torque falls in the allowable range in crushing the grinding object.

Thus, no matter whether the output frequency of the inverter 40 is set to the rated frequency, a frequency equal to or greater than the rated frequency or a frequency equal to or lower than the rated frequency, it is determined whether or not the actual torque T falls in the allowable range. Therefore, even when transient overload is caused, the actual torque T does not exceed the allowable range, and it can be definitely determined whether or not the grinding object can be crushed.

The torque value calculation unit 79 calculates a statistic by collecting torque values detected by the physical amount detection unit 71. The statistic can be, for example, a mean, a maximum value or the like of peak values of the torque obtained by detecting a plurality of peak values of the torque as illustrated in FIGS. 17 to 20.

The determination unit 78 determines whether or not the grinding object can be crushed depending upon whether or not the statistic of the torque calculated by the torque value calculation unit 79 falls in the allowable torque range. Since the statistic is used, it is determined, in consideration of torque variation caused depending upon the grinding/crushing state of a grinding object, whether or not the torque falls in the allowable range, and it can be definitely determined whether or not the grinding object can be crushed.

The correspondence relationship as illustrated in FIG. 21 can be precedently defined by collecting data of various materials. Then, the correspondence relationship between the output frequency of the inverter 40 and the torque of the motor 20 of each of the materials can be stored in a storage unit 75.

The torque value correction unit 81 corrects the torque detected by the physical amount detection unit 71 on the basis of the correspondence relationship stored in the storage unit 75. Incidentally, in this case, a user may be allowed to set for which material the torque is to be corrected. As the output frequency of the inverter 40 is increased (higher), the rotational frequency of the motor shaft is increased (higher), and therefore, the ratio of the inertia-added torque occupying in the actual torque T is increased. In other words, a ratio of the torque Tm occupying in the actual torque T (which ratio is designated as the load ratio to the rated torque of the motor) is reduced. Therefore, with the load ratio to the output frequency of the inverter 40 (the load ratio to the rated torque of the motor) stored as the correspondence relationship, the detected torque is corrected so that the detected torque Tm can be substantially equivalent to the actual torque T. In this manner, the actual torque T, including the inertia-added torque not appearing on the drive current value of the motor 20 but caused by the inertia of the motor shaft, can be obtained as a corrected torque value.

Incidentally, instead of employing the configuration in which the correspondence relationship between the output frequency of the inverter 40 and the load ratio is stored in the storage unit 75, the correspondence relationship can be specified on a real-time basis.

The load ratio specification unit 80 specifies the correspondence relationship between the output frequency of the inverter 40 and the torque of the motor 20 (the load ratio at every frequency) on the basis of a torque detected by the physical amount detection unit 71 with the inverter 40 operated in a range from the low frequency region to the vicinity of the rated frequency.

Incidentally, instead of the method for specifying the correspondence relationship with the inverter 40 operated in the range from the low frequency region to the vicinity of the rated frequency, another method can be employed.

For example, with the inverter 40 operated at an arbitrary frequency in the low frequency region, torque values detected by the physical amount detection unit 71 are collected. The collected torque values are used to calculate a statistic (such as a mean, a median or a mode) of the torque by the torque value calculation unit 79. On the basis of the calculated statistic, the load ratio specification unit 80 estimates the torque of the motor 20 against the output frequency of the inverter 40 (a frequency other than the arbitrary frequency), so as to specify the correspondence relationship between the output frequency of the inverter 40 and the torque of the motor 20 (the load ratio at every frequency).

More specifically, if, for example, the relationship between the output frequency of the inverter 40 and the load ratio of the motor 20 is precedently approximated as a line (or a curve) and the inclination of the line or an approximation formula or the like of the curve is known, the approximated line or curve is corrected so that the line or curve can pass through coordinates corresponding to collected statistics, and a point (coordinate) on the corrected line or curve can be obtained as the torque of the motor 20 against the output frequency of the inverter 40.

The torque value correction unit 81 corrects the torque detected by the physical amount detection unit 71 on the basis of the correspondence relationship specified by the load ratio specification unit 80. As the correspondence relationship, the load ratio to the output frequency of the inverter 40 (the load ratio to the rated torque of the motor) is specified, and the detected torque Tm is corrected so that the detected torque Tm can be substantially equivalent to the actual torque T. In this manner, the actual torque T, including the inertia-added torque not appearing on the drive current value of the motor 20 but caused by the inertia of the motor shaft, can be obtained as a corrected torque value.

Figure 22:
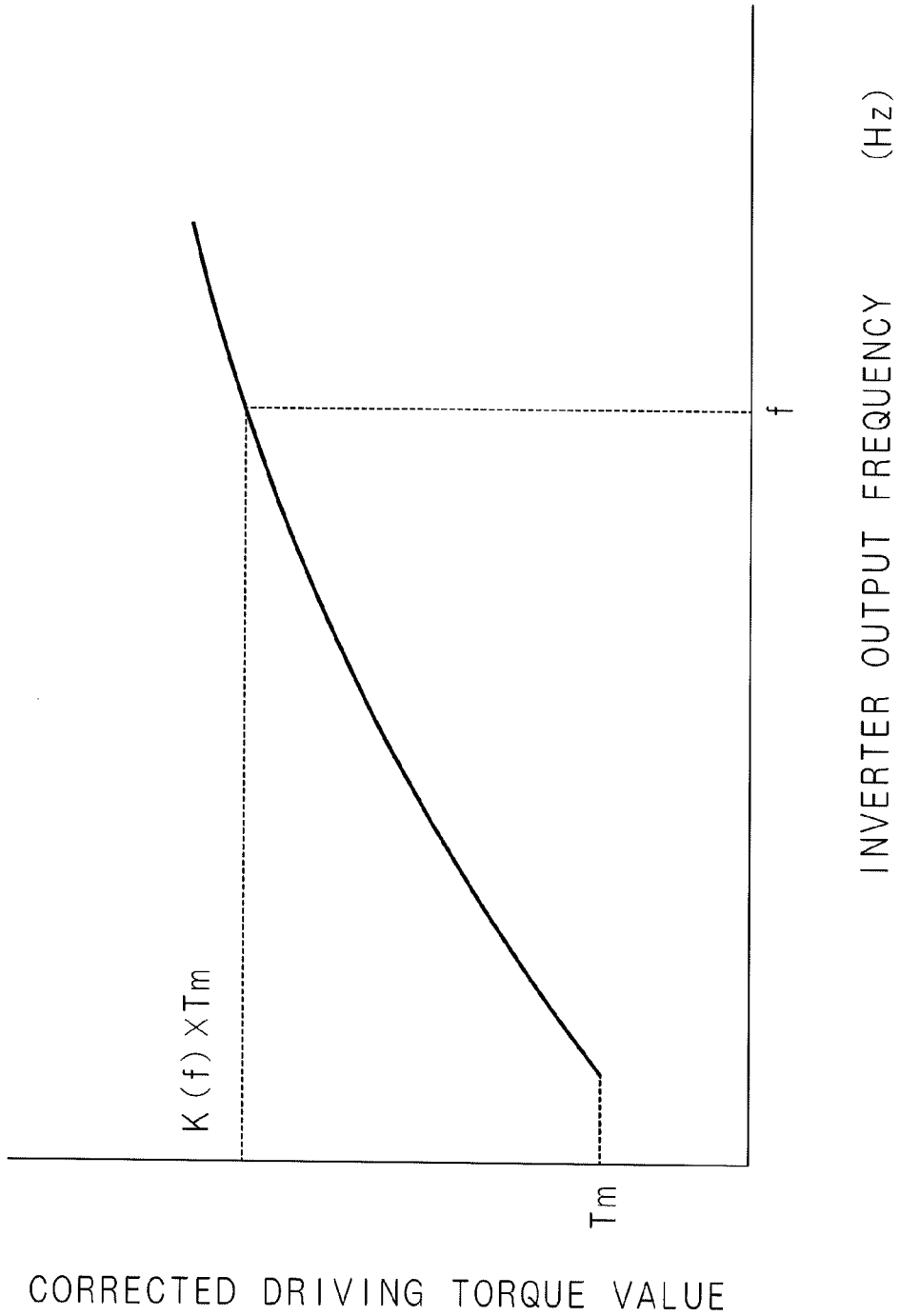
FIG. 22 is an explanatory diagram illustrating an example of correction of a torque value.

FIG. 22 is an explanatory diagram illustrating an example of the correction of torque values. In FIG. 22, the abscissa indicates the output frequency f of the inverter 40, and the ordinate indicates a corrected torque value (corrected driving torque value) $K(f) \times Tm$. As illustrated in FIG. 22, assuming that a torque in a low frequency region (of, for example, 6 Hz) is Tm, a corrected torque at an arbitrary frequency f can be obtained as $K(f) \times Tm$. Here, $K(f)$ is a function using the frequency f as a variable, and as the frequency f is increased, the corrected torque value is larger beyond the torque Tm. Incidentally, $K(f) > 1$. In this manner, the correction for approximating the torque Tm to the actual torque T can be performed in the entire frequency region in accordance with an inertia-added torque component not appearing on the drive current value of the motor 20 but caused by the inertia of the motor shaft.

A rotational frequency control unit 74 controls the rotational frequency of the rotating shaft of the crusher main body 50 by controlling the frequency of the inverter 40 in accordance with a magnitude relationship between the corrected torque and a prescribed torque threshold value. Since the motor shaft of the motor 20 is connected to the rotating shaft via the reduction gear 30, the control of the rotational frequency of the rotating shaft has the same meaning as the control of the rotational frequency of the motor shaft of the motor 20 by changing the output frequency of the inverter 40.

Furthermore, the rotational frequency control unit 74 can predict, on the basis of the torque detected by the physical amount detection unit 71 or a frequency instruction of its own, whether the motor 20 is operated with the constant torque characteristic or with the constant output characteristic.

In the case where the motor 20 is operated, for example, at a rotational frequency equal to or greater than the base rotational frequency, the rotational frequency control unit 74 controls the rotational frequency of the rotating shaft of the crusher main body 50 in accordance with a magnitude relationship between a corrected torque and a prescribed torque threshold value. The output characteristic of the motor 20 controlled by the inverter 40 shows the constant torque characteristic at a rotational frequency equal to or lower than the base rotational frequency and shows the constant output characteristic at a rotational frequency equal to or greater than the base rotational frequency. If the motor 20 is operated at a rotational frequency equal to or greater than the base rotational frequency, namely, operated in the constant output region, the rotational frequency control unit 74 controls the rotational frequency of the rotating shaft of the crusher main body 50 in accordance with a magnitude relationship between a corrected torque and a prescribed torque threshold value.

If, for example, the corrected torque is smaller than the torque threshold value, the load is low, and hence, the torque is lowered by increasing the rotational frequency of the rotating shaft of the crusher main body 50 for increasing the grinding capacity. Alternatively, if the corrected torque is larger than the torque threshold value, the load is high, and hence, the torque is increased by lowering the rotational frequency for preventing the overload stop. Thus, a torque characteristic in accordance with the load characteristic can be realized, the maximum processing capacity can be attained, and the torque can be changed in accordance with load variation. Accordingly, there is no need to precedently provide a motor with a large capacity (a large rated value), and there is no need to operate a motor with a large capacity at a low load ratio, and hence, an inexpensive motor with a low capacity can be used and the energy can be saved.

Furthermore, since the rotational frequency is controlled by using the corrected torque corresponding to the actual torque, even if the transient overload is caused depending upon the grinding/crushing state of a grinding object, damage of the rotary blade, the fixed blade, the rotating shaft, the gear or the reduction gear can be prevented.

The operation unit 82 accepts an operation of, for example, the determination operation for determining whether or not a grinding object can be crushed, or an actual operation. The display unit 83 displays a result of the determination operation.

Also in Embodiment 4, functions and effects similar to those exemplarily illustrated in FIG. 11 can be attained. Besides, the physical amount detection unit 71 may employ a configuration for detecting a torque current Ir of the motor 20 or a configuration for detecting a load current of the motor 20, and in either configuration, a feature amount of the motor 20 is detected as a characteristic instead of the torque.

Embodiment 5

Although what is called a uniaxial type crusher is described as an example in each of Embodiments 1 to 4 above, the crusher is not limited to the uniaxial type but may be one including a plurality of rotating shafts and rotary blades provided on the respective rotating shafts.

Figure 23:
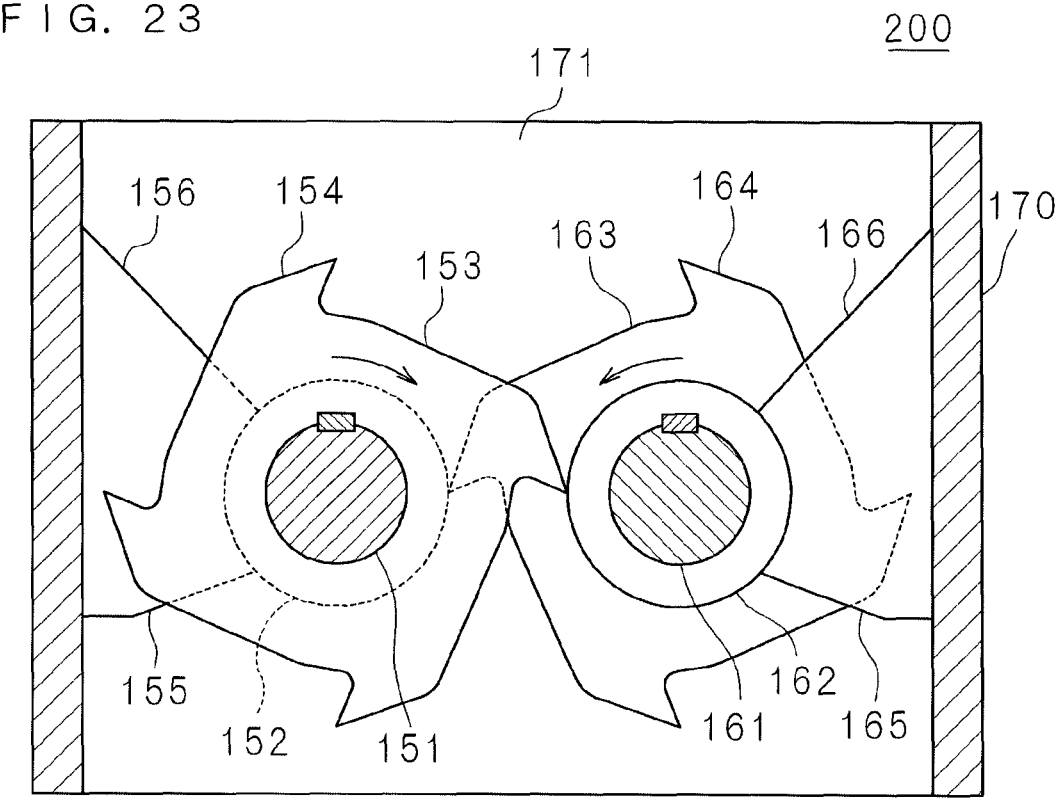
FIG. 23 is a principal part cross-sectional view of an example of a crusher main body according to Embodiment 5.

FIG. 23 is a principal part cross-sectional view illustrating an example of a crusher main body 200 according to Embodiment 5. Differently from Embodiments 1 to 4, two rotating shafts on which rotary blades are fixed are provided. In FIG. 23, two rotating shafts 151 and 161 are transversely provided in parallel to each other within a chassis 170. Incidentally, each of the rotating shafts 151 and 161 may be provided with a reduction gear and a motor (not shown), or one motor and one reduction gear may be used for rotating the two rotating shafts 151 and 161. It is noted that the rotating shafts 151 and 161 are synchronously rotated at the same speed in directions shown with arrows in FIG. 23.

In the rotating shaft 151, a plurality of large-diameter rotary blades 153 are fit to be arranged at prescribed intervals along the shaft direction of the rotating shaft 151. Small-diameter collars 152 are fixed between adjacent rotary blades 153. A blade portion 154 in the shape of an arm having a tip (edge) curved toward the rotating direction is provided to be projected from the periphery of each rotary blade 153.

Similarly, in the rotating shaft 161, a plurality of large-diameter rotary blades 163 are fit to be arranged at prescribed intervals along the shaft direction of the rotating shaft 161. Small-diameter collars 162 are fixed between adjacent rotary blades 163. A blade portion 164 in the shape of an arm having a tip (edge) curved toward the rotating direction is provided to be projected from the periphery of each rotary blade 163.

On the inner walls of the chassis 170, guide walls 156 and 166 are provided. A scraper 155 is provided below the guide wall 156. The scraper 155 is slidably in contact with the outer periphery of the collar 152, and has a comb-shaped tip according to the rotational orbits of the rotary blades 153. Besides, a scraper 165 is provided below the guide wall 166. The scraper 165 is slidably in contact with the outer periphery of the collar 162, and has a comb-shaped tip according to the rotational orbits of the rotary blades 163.

The crusher main body 200 of Embodiment 5 can be operated by employing a configuration similar to that illustrated in FIG. 3, 9, 14 or 16.

If a grinding object is introduced through an opening 171 disposed in an upper portion of the chassis 170, the grinding object is drawn in toward the center of the chassis 170 by the blade portions 154 and 164 of the rotating rotary blades 153 and 163, so that the grinding object can be crushed (cut) by the blade portions 154 and 164. The thus obtained crushed pieces are discharged to a lower portion of the chassis 170 in accordance with the rotation of the rotary blades 153 and 163.

The crushed pieces moving upward in accordance with the rotation of the rotary blades 153 and 163 can be scraped off downward by the scrapers 155 and 165.

Although the crusher is described as an example of the electrical apparatus in each of the aforementioned embodiments, the electrical apparatus is not limited to the crusher, but any electrical apparatus used in industrial machinery apart from the crusher is applicable as long as it deals with various types of loads. In other words, an electrical apparatus used in a motor drive torque control device mentioned in appended claims is not limited to a crusher but includes other electrical apparatuses. Such an electrical apparatus is one including a rotor on a rotating shaft, and examples include a machine tool, a rolling mill, a forming machine, a steel machine, an elevator and a hoisting crane.

Although the configuration using the reduction gear separated from the motor is described in each of the aforementioned embodiments, the reduction gear is not indispensable, and for example, a geared motor or the like can be used instead.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A drive control device for controlling drive of an electrical apparatus, which includes a rotor provided on a rotating shaft rotated by an electric motor driven by an inverter for converting a frequency of an AC power supply, comprising:
   a physical amount detection unit for detecting a plurality of physical amounts pertaining to an output of the electric motor;
   a storage unit for storing threshold values for the physical amounts;
   a rotational frequency determination unit for determining whether or not a rotational frequency of the electric motor is equal to or greater than a base rotational frequency;
   a selection unit for selecting a threshold value for each of the physical amounts in accordance with a determination result obtained by the rotational frequency determination unit; and
   a control unit for controlling a rotational frequency of the rotating shaft in accordance with a magnitude relationship between a physical amount detected by the physical amount detection unit and a threshold value selected by the selection unit;
   wherein:
   the physical amount detection unit detects the output of the electric motor, the selection unit selects a specific power threshold value if the rotational frequency of the electric motor is equal to or greater than the base rotational frequency, and the control unit controls the rotational frequency of the rotating shaft in accordance with a magnitude relationship between the output detected by the physical amount detection unit and the specific power threshold value; or
   the physical amount detection unit detects a feature amount pertaining to a torque of the electric motor, the selection unit selects a specific torque amount threshold value if the rotational frequency of the electric motor is not equal to or greater than the base rotational frequency, and the control unit controls the rotational frequency of the rotating shaft in accordance with a magnitude relationship between the feature amount detected by the physical amount detection unit and the specific torque amount threshold value; or
   the device further comprises a determination unit that causes the inverter to convert the frequency of the AC power supply to a low frequency lower than the frequency and causes the rotor to perform a prescribed process to determine whether or not the process by the rotor can be performed.

2. The drive control device according to claim 1, wherein the physical amount detection unit detects the output of the electric motor,
   the selection unit selects a specific power threshold value if the rotational frequency of the electric motor is equal to or greater than the base rotational frequency, and
   the control unit controls the rotational frequency of the rotating shaft in accordance with a magnitude relationship between the output detected by the physical amount detection unit and the specific power threshold value.

3. The drive control device according to claim 1, wherein the physical amount detection unit detects a feature amount pertaining to a torque of the electric motor,
   the selection unit selects a specific torque amount threshold value if the rotational frequency of the electric motor is not equal to or greater than the base rotational frequency, and the control unit controls the rotational frequency of the rotating shaft in accordance with a magnitude relationship between the feature amount detected by the physical amount detection unit and the specific torque amount threshold value.

4. The drive control device according to claim 1, further comprising a determination unit that causes the inverter to convert the frequency of the AC power supply to a low frequency lower than the frequency and causes the rotor to perform a prescribed process to determine whether or not the process by the rotor can be performed.

5. The drive control device according to claim 4, further comprising a statistic calculation unit for calculating a statistic by collecting feature amounts pertaining to a torque detected by the physical amount detection unit,
wherein the determination unit determines whether or not the process can be performed on the basis of the statistic calculated by the statistic calculation unit.

6. An electrical apparatus comprising an inverter for converting a frequency of an AC power supply, an electric motor driven by the inverter, a rotor provided on a rotating shaft rotated by the electric motor, and the drive control device according to claim 2,
wherein the drive control device controls a rotational frequency of the rotating shaft.

7. A drive control device for controlling drive of an electrical apparatus, which includes a rotor provided on a rotating shaft rotated by an electric motor driven by an inverter for converting a frequency of an AC power supply, comprising:
a physical amount detection unit for detecting a feature amount pertaining to a torque of the electric motor;
a threshold value calculation unit for calculating a feature amount threshold value for the feature amount,
a control unit for controlling, in operating the electric motor at a rotational frequency equal to or greater than a base rotational frequency, a rotational frequency of the rotating shaft in accordance with a magnitude relationship between the feature amount detected by the physical amount detection unit and the feature amount threshold value calculated by the threshold value calculation unit; and
a frequency detection unit for detecting a frequency converted by the inverter,
wherein the threshold value calculation unit calculates the feature amount threshold value on the basis of the frequency detected by the frequency detection unit and a reference threshold value corresponding to the base rotational frequency, and
the control unit controls the rotational frequency of the rotating shaft in accordance with the magnitude relationship between the feature amount detected by the physical amount detection unit and the feature amount threshold value calculated by the threshold value calculation unit.

8. The drive control device according to claim 7,
wherein in operating the electric motor at a rotational frequency equal to or greater than the base rotational frequency, the control unit lowers the rotational frequency of the rotating shaft if the feature amount detected by the physical amount detection unit is larger than the feature amount threshold value.

9. The drive control device according to claim 7,
wherein in operating the electric motor at a rotational frequency equal to or greater than the base rotational frequency, the control unit increases the rotational frequency of the rotating shaft if the feature amount detected by the physical amount detection unit is smaller than the feature amount threshold value.

10. An electrical apparatus comprising an inverter for converting a frequency of an AC power supply, an electric motor driven by the inverter, a rotor provided on a rotating shaft rotated by the electric motor, and the drive control device according to claim 7,
wherein the drive control device controls a rotational frequency of the rotating shaft.

11. A drive control device for controlling drive of an electrical apparatus, which includes a rotor provided on a rotating shaft rotated by an electric motor driven by an inverter for converting a frequency of an AC power supply, comprising:
a physical amount detection unit for detecting an output of the electric motor;
a threshold value calculation unit for calculating a power threshold value for the output of the electric motor,
a control unit for controlling, in operating the electric motor at a rotational frequency equal to or lower than a base rotational frequency, a rotational frequency of the rotating shaft in accordance with a magnitude relationship between the output detected by the physical amount detection unit and the power threshold value calculated by the threshold value calculation unit; and
a frequency detection unit for detecting a frequency converted by the inverter,
wherein the threshold value calculation unit calculates the power threshold value on the basis of the frequency detected by the frequency detection unit and a reference threshold value corresponding to the base rotational frequency, and
the control unit controls the rotational frequency of the rotating shaft in accordance with the magnitude relationship between the output detected by the physical amount detection unit and the power threshold value calculated by the threshold value calculation unit.

12. The drive control device according to claim 11,
wherein in operating the electric motor at a rotational frequency equal to or lower than the base rotational frequency, the control unit lowers the rotational frequency of the rotating shaft if the output detected by the physical amount detection unit is larger than the power threshold value.

13. The drive control device according to claim 11,
wherein in operating the electric motor at a rotational frequency equal to or lower than the base rotational frequency, the control unit increases the rotational frequency of the rotating shaft if the output detected by the physical amount detection unit is smaller than the power threshold value.

14. An electrical apparatus comprising an inverter for converting a frequency of an AC power supply, an electric motor driven by the inverter, a rotor provided on a rotating shaft rotated by the electric motor, and the drive control device according to claim 11,
wherein the drive control device controls a rotational frequency of the rotating shaft.

15. A drive control device for controlling drive of an electrical apparatus, which includes a rotor provided on a rotating shaft rotated by an electric motor driven by an inverter for converting a frequency of an AC power supply, comprising:
a physical amount detection unit for detecting a feature amount pertaining to a torque of the electric motor;
a threshold value calculation unit for calculating a feature amount threshold value for the feature amount,
a control unit for controlling, in operating the electric motor at a rotational frequency equal to or greater than a base rotational frequency, a rotational frequency of the rotating shaft in accordance with a magnitude relationship between the feature amount detected by the physical amount detection unit and the feature amount threshold value calculated by the threshold value calculation unit; and a determination unit that causes the inverter to convert the frequency of the AC power supply to a low frequency lower than the frequency and causes the rotor to perform a prescribed process to determine whether or not the process by the rotor can be performed.

16. A drive control device for controlling drive of an electrical apparatus, which includes a rotor provided on a rotating shaft rotated by an electric motor driven by an inverter for converting a frequency of an AC power supply, comprising:
a physical amount detection unit for detecting an output of the electric motor;
a threshold value calculation unit for calculating a power threshold value for the output of the electric motor,
a control unit for controlling, in operating the electric motor at a rotational frequency equal to or lower than a base rotational frequency, a rotational frequency of the rotating shaft in accordance with a magnitude relationship between the output detected by the physical amount detection unit and the power threshold value calculated by the threshold value calculation unit; and
a determination unit that causes the inverter to convert the frequency of the AC power supply to a low frequency lower than the frequency and causes the rotor to perform a prescribed process to determine whether or not the process by the rotor can be performed.

17. A drive control method for an electrical apparatus, which includes a rotor provided on a rotating shaft rotated by an electric motor driven by an inverter for converting a frequency of an AC power supply, comprising the steps of:
detecting a plurality of physical amounts pertaining to an output of the electric motor;
determining, with threshold values for the physical amounts stored, whether or not a rotational frequency of the electric motor is equal to or greater than a base rotational frequency;
selecting a threshold value for each of the physical amounts in accordance with a determination result obtained in the determining step; and
controlling a rotational frequency of the rotating shaft in accordance with a magnitude relationship between a detected physical amount and a selected threshold value, wherein
detecting the output of the electric motor, selecting a specific power threshold value if the rotational frequency of the electric motor is equal to or greater than the base rotational frequency, and
controlling the rotational frequency of the rotating shaft in accordance with a magnitude relationship between the output detected and the specific power threshold value.

18. A drive control method for an electrical apparatus, which includes a rotor provided on a rotating shaft rotated by an electric motor driven by an inverter for converting a frequency of an AC power supply, comprising the steps of:
detecting a feature amount pertaining to a torque of the electric motor;
calculating a feature amount threshold value for the feature amount,
controlling, in operating the electric motor at a frequency equal to or greater than a base rotational frequency, a rotational frequency of the rotating shaft in accordance with a magnitude relationship between the detected feature amount and the calculated feature amount threshold value, and
detecting a frequency converted by the inverter, wherein
calculating the feature amount threshold value on the basis of the frequency detected and a reference threshold value corresponding to the base rotational frequency, and
controlling the rotational frequency of the rotating shaft in accordance with the magnitude relationship between the feature amount detected and the feature amount threshold value calculated.

19. A drive control method for an electrical apparatus, which includes a rotor provided on a rotating shaft rotated by an electric motor driven by an inverter for converting a frequency of an AC power supply, comprising the steps of:
detecting an output of the electric motor;
calculating a power threshold value for the output of the electric motor,
controlling, in operating the electric motor at a rotational frequency equal to or lower than a base rotational frequency, a rotational frequency of the rotating shaft in accordance with a magnitude relationship between the detected output and the calculated power threshold value; and
detecting a frequency converted by the inverter, wherein
calculating the power threshold value on the basis of the frequency detected and a reference threshold value corresponding to the base rotational frequency, and
controlling the rotational frequency of the rotating shaft in accordance with the magnitude relationship between the output detected and the power threshold value calculated.

* * * * *